United States Patent
Gu et al.

(10) Patent No.: US 7,804,864 B2
(45) Date of Patent: Sep. 28, 2010

(54) HIGH POWER SHORT PULSE FIBER LASER

(75) Inventors: Xinhua Gu, Ann Arbor, MI (US); Mark Bendett, Ann Arbor, MI (US); Gyu Choen Cho, Ann Arbor, MI (US)

(73) Assignee: IMRA America, Inc., Ann Arbor, MI (US)

( * ) Notice: Subject to any disclaimer, the term of this patent is extended or adjusted under 35 U.S.C. 154(b) by 304 days.

(21) Appl. No.: 10/814,319

(22) Filed: Mar. 31, 2004

(65) Prior Publication Data

US 2005/0226278 A1 Oct. 13, 2005

(51) Int. Cl.
*H01S 3/30* (2006.01)
(52) U.S. Cl. .............................. 372/6; 372/18; 372/30; 372/31
(58) Field of Classification Search .................. 372/30, 372/31, 6, 18
See application file for complete search history.

(56) References Cited

U.S. PATENT DOCUMENTS

| | | | |
|---|---|---|---|
| 5,440,573 A | 8/1995 | Fermann | |
| 5,450,427 A | 9/1995 | Fermann | |
| 5,880,877 A | 3/1999 | Fermann et al. | |
| 6,151,338 A | 11/2000 | Grubb et al. | |
| 6,570,892 B1 * | 5/2003 | Lin et al. | 372/6 |
| 6,590,910 B2 * | 7/2003 | Lin | 372/18 |
| 6,693,927 B1 * | 2/2004 | Horvath et al. | 372/18 |
| 6,813,429 B2 * | 11/2004 | Price et al. | 385/125 |
| 6,885,683 B1 | 4/2005 | Fermann | |
| 6,901,085 B2 * | 5/2005 | Hu et al. | 372/6 |
| 7,088,756 B2 | 8/2006 | Fermann | |
| 7,414,780 B2 | 8/2008 | Fermann | |
| 2003/0156605 A1 | 8/2003 | Richardson | |
| 2005/0226286 A1 | 10/2005 | Liu | |

FOREIGN PATENT DOCUMENTS

JP  2002-118315  4/2002

OTHER PUBLICATIONS

Lefort, et al., "Practical low-noise stretched-pulse Yb$^3$+-doped fiber laser", 2002 Optical Society of America, Mar. 1, 2002, vol. 27, No. 5, Optics Letters, pp. 291-293.
Lim, et al., "Generation of 2-nJ pulses from a femtosecond ytterbium fiber laser", 2003 Optical Society of America, Apr. 15, 2003, vol. 28, No. 8, Optics Letters, pp. 660-662.

(Continued)

*Primary Examiner*—Tod T Van Roy
(74) *Attorney, Agent, or Firm*—Knobbe Martens Olson & Bear LLP

(57) ABSTRACT

A pulsed laser comprises an oscillator and amplifier. An attenuator and/or pre-compressor may be disposed between the oscillator and amplifier to improve performance and possibly the quality of pulses output from the laser. Such pre-compression may be implemented with spectral filters and/or dispersive elements between the oscillator and amplifier. The pulsed laser may have a modular design comprising modular devices that may have Telcordia-graded quality and reliability. Fiber pigtails extending from the device modules can be spliced together to form laser system. In one embodiment, a laser system operating at approximately 1050 nm comprises an oscillator having a spectral bandwidth of approximately 19 nm. This oscillator signal can be manipulated to generate a pulse having a width below approximately 90 fs.

27 Claims, 14 Drawing Sheets

OTHER PUBLICATIONS

Ilday, at al., "Generation of 50-fs, 5nJ pulses at 1.03 μm from a wave-breaking-free fiber laser", 2003 Optical Society of America, Aug. 1, 2003, vol. 28, No. 15, Optics Letters, pp. 1365-1367.

Okhotnikov, et al., "980-nm Picosecond Fiber Laser", IEEE Photonics Technology Letters, vol. 15, No. 11, Nov. 2003, pp. 1519-1521.

* cited by examiner

HIGH POWER SHORT PULSE FIBER LASER

BACKGROUND

1. Field

The present teachings relate to waveguide-based lasers, such as fiber lasers, that output high power short laser pulses. More particularly, the present teachings relate to pulsed lasers that provide improved performance such as reduced pulse width and that preferably include modular designs that are compact and rugged.

2. Description of the Related Art

High power laser sources are of interest for practical applications in various fields. High peak power pulsed lasers are desirable, for instance, in medical and industrial applications, remote sensing applications, and in optical parametric oscillators. Some specific exemplary applications include use as pump sources for optical amplifiers and Raman lasers for use in medicine and spectroscopy. Rare-earth-doped double clad fiber lasers offer an excellent combination of high power and special beam quality that may be particularly useful.

Various of the following references discuss laser systems and are hereby incorporated herein by reference:

[1] U.S. patent application Ser. No. 09/576,772 filed on May 23, 2000 by M. E. Fermann, A. Galvanauskas, and D. Harter entitled "Modular, high energy, widely-tunable ultrafast fiber source";

[2] U.S. patent application Ser. No. 10/627,069 filed on Jul. 24, 2003 by M. E. Fermann, and G. C. Cho entitled "Integrated Fiber Laser Pulse Source With Pulse Width Control";

[3] U.S. Pat. No. 6,151,338 issued to S. G. Grubb, D. F. Welch, and R. Zanoni in Nov. 21, 2000 entitled "High power laser optical amplifier system";

[4] O. G. Okhotnikov, L. A. Gomes, N. Xiang. T. Jouhti, A. K. Chin, R. Singh, and A. B. Grudinin, "980-nm picosecond fiber laser" IEEE Photonics Technology Letters, 15 (11), 1519-1521 (2003); and

[5] H. Lim, F. O. Ilday, and F. W. Wise, "Generation of 2-nJ pulses from a femtosecond ytterbium fiber laser" Optics Letters, 28 (8), 660-662 (2003).

Currently, conventional pulse lasers have practical limitations. For example, the optical components in conventional commercial short and ultra-short pulse lasers are normally mounted mechanically on a mounting plate such as a breadboard. Such mounting of components can result in a bulky packaging and can suffer from mechanical vibrations and environmental instabilities. Additionally, such mounting requires frequent alignment to achieve the optimum performance. Thus there is a need for improved lasers and laser systems.

SUMMARY

One embodiment of the invention comprises a pulsed fiber laser outputting pulses having a duration and corresponding pulse width. The pulsed laser comprises a modelocked fiber oscillator, an amplifier, a variable attenuator, and a compressor. The a modelocked fiber oscillator outputs optical pulses. The amplifier is optically connected to the modelocked fiber oscillator to receive the optical pulses. The amplifier comprises a gain medium that imparts gain to the optical pulse. The a variable attenuator is disposed between the modelocked fiber oscillator and the amplifier. The variable attenuator has an adjustable transmission such that the optical energy that is coupled from the mode-locked fiber oscillator to the amplifier can be reduced. The compressor compresses the pulse thereby reduces the width of the pulse. Preferably a minimum pulse width is obtained.

Another embodiment of the invention comprises a method of producing compressed high power short laser pulses having an optical power of at least about 200 mW and a pulse duration of about 200 femtoseconds or less. In this method, longitudinal modes of a laser cavity are substantially modelocked to repetitively produce a laser pulse. The laser pulse is amplified. The laser pulse is also chirped thereby changing the optical frequency of the optical pulse over time. The laser pulse is also compressed by propagating different optical frequency components of the laser pulse differently to produce compressed laser pulses having a shortened temporal duration. In addition, the laser pulse is selectively attenuated prior to the amplifying of the laser pulse to further shorten the duration of the compressed laser pulses.

Another embodiment of the invention comprises a method of manufacturing a high power short pulse fiber laser. This method comprises mode-locking a fiber-based oscillator that outputs optical pulses. This method further comprises optically coupling an amplifier to the fiber-based oscillator through a variable attenuator so as to feed the optical pulses from the fiber-based oscillator through the variable attenuator and to the amplifier. The variable attenuator is adjusted based on a measurement of the optical pulses to reduce the intensity of the optical pulses delivered to the amplifier and to shorten the pulse.

Another embodiment of the invention comprises a pulsed fiber laser outputting pulses having a pulse width. The pulsed fiber laser comprises a modelocked fiber oscillator, an amplifier, and a spectral filter. The modelocked fiber oscillator produces an optical output comprising a plurality of optical pulses having a pulse width and a spectral power distribution having a bandwidth. The amplifier is optically connected to the modelocked fiber amplifier for amplifying the optical pulses. The spectral filter is disposed to receive the optical output of the modelocked fiber oscillator prior to reaching the amplifier. The spectral filter has a spectral transmission with a band edge that overlaps the spectral power distribution of the optical output of the modelocked fiber oscillator to attenuate a portion of the spectral power distribution and thereby reduce the spectral bandwidth. The pulse width of the optical pulses coupled from the mode lock fiber oscillator to the fiber amplifier is thereby reduced.

Another embodiment of the invention comprises a method of producing compressed optical pulses. In this method, longitudinal modes of a fiber resonant cavity are substantially mode-locked so as to produce a train of optical pulses having a corresponding spectral power distribution with a spectral bandwidth. The optical pulses are amplified and compressed to produce compressed optical pulses. The spectral bandwidth of the spectral power distribution is reduced such that the compressed optical pulses have a shorter duration.

Another embodiment of the invention comprises a pulsed fiber laser comprising a modelocked fiber oscillator, an amplifier, one or more optical pump sources, a pulse compressor, and a pre-compressor. The modelocked fiber oscillator comprises a gain fiber and a pair of reflective optical elements disposed with respect to the gain fiber to form a resonant cavity. The modelocked fiber oscillator produces a train of optical pulses having an average pulse width. The amplifier is optically connected to the modelocked fiber amplifier such that the optical pulses can propagate through the amplifier. The fiber amplifier amplifies the optical pulses. The one or more optical pump sources are optically connected to the modelocked fiber oscillator and the fiber amplifier to pump the fiber oscillator and fiber amplifier. The pulse compressor is optically coupled to receive the amplified optical pulses output from fiber amplifier. The pulse compressor shortens the pulse width of the optical pulses output by the fiber amplifier. The pre-compressor is disposed in an optical path between the modelocked fiber oscillator and the fiber amplifier. The pre-compressor shortens the duration of the optical pulses introduced into the fiber amplifier such that the pulse duration of the optical pulses output by the compressor can be further shortened.

Another embodiment of the invention comprises a method of generating short high power optical pulses. The method comprises substantially mode-locking optical modes of a laser cavity to produce an optical signal comprising a plurality of laser pulses having an average pulse width. The optical signal comprises a distribution of frequency components. The method further comprises compressing the optical pulses and amplifying the compressed optical pulses to produce amplified compressed optical pulses. The amplified compressed optical pulses are further compressed subsequent to the amplifying using a dispersive optical element to differentiate between spectral components and introducing different phase shifts to the different spectral components.

Another embodiment of the invention comprises a pulsed fiber laser comprising a modelocked fiber oscillator, a fiber amplifier, an optical pump source, and a pulse compressor. The modelocked fiber oscillator outputs optical pulses. The fiber amplifier is optically connected to the modelocked fiber oscillator and amplifies the optical pulses. The optical pump source is optically connected to the fiber amplifier. The pulse compressor is optically coupled to receive the amplified optical pulses output from fiber amplifier. The pulsed fiber laser further comprises at least one of (i) a first optical tap in the optical path between the modelocked fiber oscillator and the fiber amplifier and a first feedback loop from the first tap to control the modelocked fiber oscillator based on measurement of output from the first optical tap, and (ii) a second optical tap in the optical path between the fiber amplifier and the compressor and a second feedback loop from the second tap to control the fiber amplifier based on measurement of output from the first optical tap.

Another embodiment of the invention comprises a pulsed light source comprising a light source module, an isolator module, an amplifier module, and a compressor module. The light source module comprises an optical fiber and outputs optical pulses. The isolator module comprises an optical isolator in a housing having input and output fibers. The input fiber is optically coupled to the optical fiber of the light source module. The optical isolator is disposed in an optical path connecting the input and output fibers such that the optical pulses introduced into the input fiber are received by the isolator and permitted to continue along the optical path to the output coupler. The amplifier module comprises an amplifying medium and has an optical input optically connected to the output fiber of the isolator module to amplify the optical pulses. The compressor module is optically coupled to the amplifier module to compress the optical pulses.

DETAILED DESCRIPTION OF CERTAIN EMBODIMENTS

Figure 1:
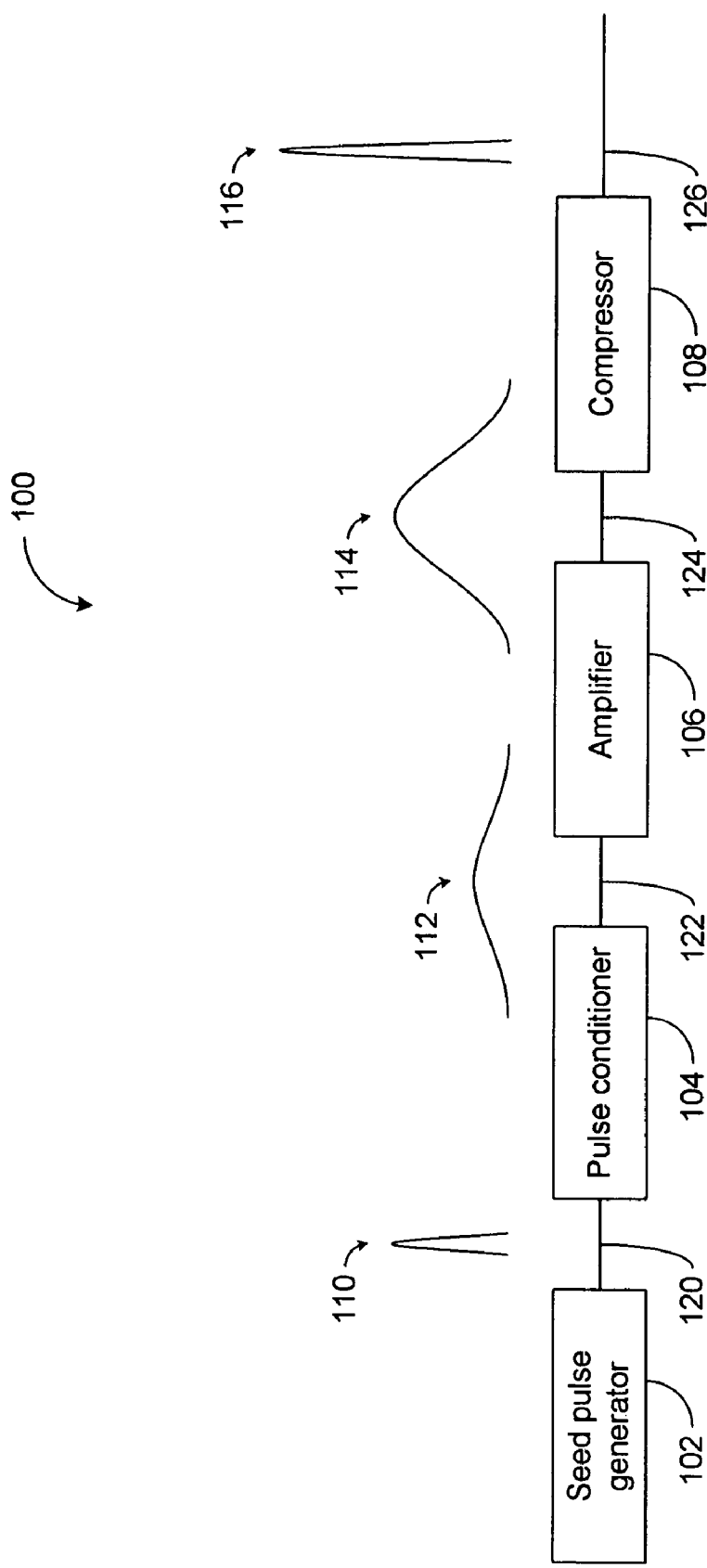
FIG. 1 illustrates a generalized modular approach to forming a high power laser pulse.

These and other aspects, advantages, and novel features of the present teachings will become apparent from the following detailed description and with reference to the accompanying drawings. In the drawings, similar elements have similar reference numerals.

FIG. 1 illustrates an overall concept of a pulse laser system 100 that outputs a high power short pulse 116. Preferably, the output pulse 116 has a temporal width that is less than approximately 200 femtoseconds (fs), and an average power that is greater than approximately 200 milliwatts (mW). It will be noted that these exemplary performance parameters are in no way intended to limit the scope of the present teachings.

To achieve a clean short pulse, several techniques can be included such as for example inclusion of attenuators, spectral filters, and compression elements as discussed more fully below. Use of one or more of such components can provide pulse widths of about 90 fs or less and average power of 200 mW or more.

Another aspect of the present teachings relates to a modular design approach where various components can be packaged as modules and the modular components can then be connected as needed. Some modules may comprise optical elements such as bulk optics or planar waveguides packaged in a housing that shields various optical elements from the operating environment. Fiber pigtails may extend from these housing, which may include thermal insulation and may be hermetically sealed. The fiber pigtails, potentially enable seamless connection to other modules via, e.g., optical fiber fusion splices. Packaging in such casing may be particularly advantageous for modules containing bulk or physical optics and opto-mechanical elements, in contrast to fiber elements, which may not require such encasement.

Such a system using fiber based components or packages having fiber inputs and outputs can benefit from the compact nature of the components, as well as effective and compact coupling afforded by splicing of the fibers. The optics within the modules preferably comprise micro-optics and fiber optics or other waveguide elements. Accordingly, the modules may be small and have reduced form factor. The modular approach may also simplify repair and alteration of laser systems as the modules can be readily substituted or replaced and re-spliced into place in the laser system.

As shown in FIG. 1, an exemplary laser system 100 comprises a seed pulse generator 102 optically coupled to a pulse conditioner 104 by a coupling 120. The seed pulse generator 102 provides a seed pulse 110 to the pulse conditioner 104. One way to amplify a short pulse in an amplifier is to broaden the pulse, lowering the amplitude of the pulse feed to the amplifier. Such an amplitude-lowered pulse can then be amplified to increase the amplitude, preferably within the linearity region of the amplifier. The amplified pulse having a broadened width can then be compressed to yield a relatively high amplitude and relatively short pulse output.

In FIG. 1, the pulse conditioner 104 is depicted as broadening its input seed pulse 110 to yield a broad and low amplitude pulse 112. The laser system 100 further comprises an amplifier 106 optically coupled to the conditioner 104 by a coupling 122. The amplifier 106 is depicted as amplifying the amplitude of the broadened pulse 112 to yield an amplified broad pulse 114. The amplified broad pulse 114 is depicted as being compressed by a compressor 108 (that is coupled to the amplifier 106 by a coupling 124) to yield an amplified short pulse output 116 as an output 126. This compressor 108 may be excluded in certain cases in embodiments described below.

It will be understood that this simplified description of pulse amplification is exemplary of a general process of amplifying a short pulse. It will also be understood, and as described below, that pulse conditioning can involve optical operations other than temporally stretching of the seed pulse. Other variations can be incorporated into the laser system to accommodate various design goals and operating conditions. Some of such design considerations are described below in greater detail. In some embodiments, for example, the pulse conditioner 104 and/or compressor 108 may be excluded. Other variations in the configuration and implementation of the laser system 100 are also possible.

In some embodiments, the seed pulse generator 102 comprises an oscillator having a rare earth doped fiber. Dopants may include, for example, Er, Yb, Nd or combinations thereof as well as other materials. The doped fiber can be single clad or double clad and may be polarization maintaining or non-polarization maintaining. Both active and passive modelocking techniques can be used to generate short and ultra-short pulses in the rare-earth doped fiber, with the passive one simpler and intrinsically more stable. Three common passive mode-locking techniques involve a saturable absorber being part of the cavity, nonlinear polarization evolution, or a combination thereof. In certain applications, passive modelocking techniques based on saturable absorbers are preferred and permit the construction of relatively simple and reliable cavities. Additional details regarding passive mode-locking techniques are disclosed in a copending U.S. patent application Ser. No. 10/627,069 filed on Jul. 24, 2003, by M. E. Fermann, and G. C. Cho entitled "Integrated Fiber Laser Pulse Source With Pulse Width Control", which is hereby incorporated herein by reference in its entirety.

The amplifier may comprise a fiber amplifier having a gain fiber such as a doped fiber. The amplifier, however, should not be limited to fiber amplifiers. Similarly, the amplifier may comprise a parabolic pulse amplifier as described in copending U.S. patent application Ser. No. 09/576,772 filed May 23, 2000, by M. E. Fermann, A. Galvanauskas, and D. Harter entitled "Modular, high energy, widely-tunable ultrafast fiber source", which is hereby incorporated herein by reference in its entirety. Other types of amplifiers, however, may be employed as well.

Figure 2A:
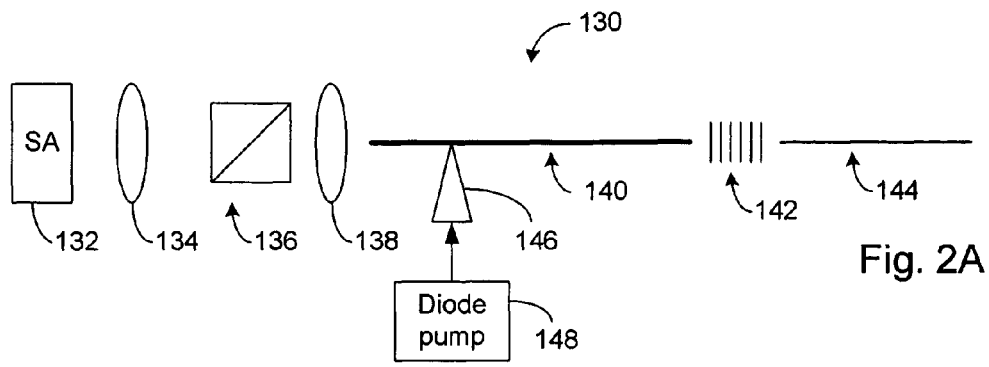
FIG. 2A schematically illustrates one embodiment of a fiber based oscillator.

FIG. 2A illustrates one embodiment of a fiber-based oscillator 130 that can provide a passive modelocked seed pulse. The exemplary oscillator 130 comprises a saturable absorber 132 and a Yb-doped gain fiber 140 that is pumped by a pump diode 148 via a pump coupler 146. (Yb-doped fiber is a good candidate, for example, in the spectral range from 1.0 µm to 1.1 µm because Yb ions present a large absorption cross section near 980 nm which allows to be pumped with low-cost commercially available laser diodes. In addition, the large fluorescence spectral range of this fiber enables the short pulse generation.) The pump diode 148 shown in FIG. 2A may be a part of the integrated oscillator module, or may be a separate module that provides an input to the oscillator module. The oscillator 130 further comprises an output fiber 144 coupled from the gain fiber 140 via a fiber grating 142. The fiber grating 142 can function as a dispersion controlling element and at the same time serve as an output coupler.

In one embodiment, the oscillator cavity fiber comprises a section of Yb-doped polarization maintaining gain fiber. The oscillator cavity fiber can further comprise an undoped polarization maintaining fiber section for controlling the total intracavity dispersion. In some embodiments, the length of this undoped portion is selected such that the undoped portion of fiber together in combination with doped fiber and the chirped fiber Bragg grating (one embodiment of the fiber grating 142) provides a zero or negative total dispersion in the cavity.

In one embodiment, the cavity fiber is relatively shorter. The use of a shorter gain fiber 140 is typically associated with a high pumping rate, thus driving the gain dynamics closer to a saturation level than that associated with a longer fiber. In addition, the population variation in the ground state of Yb dopants becomes less susceptible to the environmental temperature variation. These effects enhance the operational stability of the oscillator 130 that is exposed to variation of environmental temperature. In one embodiment, oscillator output stability is demonstrated by a dependency of output on environmental fiber temperature that is less than approximately 0.5%/C, presuming that other modules are kept at a substantially constant temperature.

As shown in FIG. 2A, the exemplary oscillator 130 further comprises an assembly of optical elements that optically couples the saturable absorber 132 to the gain fiber 140. In one embodiment, the assembly of optical elements comprises lenses 134 and 138 that collimate and focus the light between the fiber 140 and the saturable absorber 132. The assembly can further comprise a polarizer 136. These components can be include in a housing with a fiber pigtail as discussed more fully in connection with FIG. 11A.

One embodiment of the exemplary fiber oscillator in FIG. 2A can generate pulses with a spectral bandwidth in the range of approximately 1 to 30 nm, depending on the dispersion parameter of the fiber Bragg grating 142 used. With a high negative dispersion fiber Bragg grating 142, a narrow bandwidth pulse can be generated. Side peaks can also be generated due dispersive wave shedding by the soliton in the oscillator. Such side peaks can be substantially removed by including a bandpass filter.

Figure 2B:
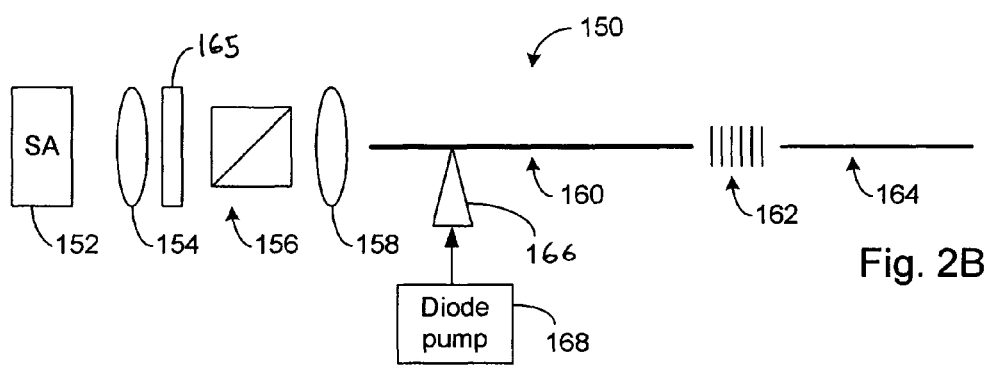
FIG. 2B schematically illustrates one embodiment of a fiber based oscillator having a filter inside the cavity to remove dispersive wave side-peaks in a soliton oscillator.

FIG. 2B illustrates one embodiment of an oscillator 150 that includes a bandpass filter 165 inside the cavity. Such a filter can remove the side peaks associated with the high negative dispersion fiber Bragg grating described above in reference to FIG. 2A, while maintaining a substantially similar spectral bandwidth.

In one embodiment, the bandwidth of the filter 165 can be predetermined within approximately 1-2 nanometer accuracy by analytical or experimental analysis of the system. Another method is to use a rotatable dielectric bandpass filter and rotate the filter to a different incidence angle and utilize the associated etalon effect to provide a variation of the spectral position and width. Yet another method is to modify the spectral shape of the transmission, for example using v- or u-type coating used in the dielectric coating industry. Such a filter can substantially eliminate side lobes in the spectrum, which may originate from nonlinear phase distortion at excessive gain or from high-order soliton formation.

As shown in FIG. 2B, the exemplary oscillator 150 having the bandpass filter 165 is depicted as being generally similar in design to the exemplary oscillator 130 of FIG. 2A. Saturable absorber 152, lenses 154, 158, polarizer 156, gain fiber 160, fiber grating 162, output fiber 164, pump coupler 166, and pump diode 168 can correspond to the saturable absorber 132, lenses 134, 138, polarizer 136, gain fiber 140, fiber grating 142, output fiber 144, pump coupler 146, and pump diode 148 of the oscillator 130. The oscillator 150 is illustrated for the purpose of describing the possible use of the bandpass filter 165. Thus, it will be understood that such a similarity in two exemplary embodiments of the oscillators should in no way be construed to limit the design of the oscillator to such a configuration.

As described above in reference to FIG. 2B, the high negative dispersion fiber grating and the associated side lobe effect can be mitigated by the use of the bandwidth filter. When a low negative dispersion grating is used, the oscillator (e.g., 130 in FIG. 2A) can generate large bandwidth spectrum, and substantially no side peak is observed.

Figure 2C:
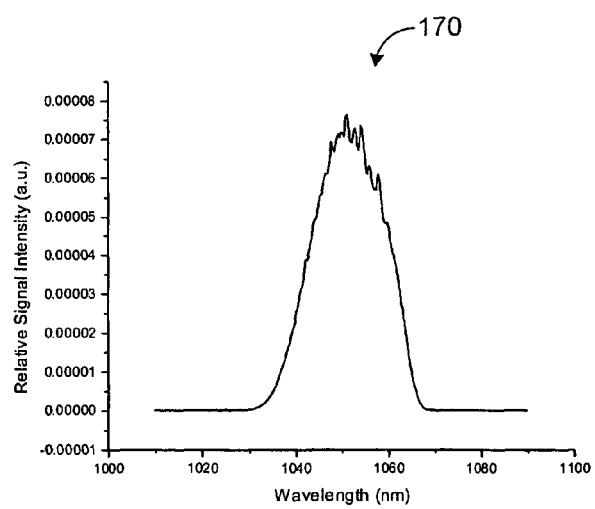
FIG. 2C illustrates an exemplary optical spectrum output by the oscillator.

FIG. 2C illustrates an exemplary spectrum 170 generated by the oscillator described above in reference to FIG. 2A, where the fiber Bragg grating has a dispersion of approximately −0.11 ps$^2$. The spectral bandwidth of this oscillator output is around 19 nm.

It will be appreciated that although the oscillator (130 and 150 in FIGS. 2A and B) is described as a fiber oscillator, the concepts of the present teachings are not limited to such oscillators. The modular oscillator can be any type of a pulsed laser preferably that outputs pulses with a temporal width preferably less than approximately 500 ps. The spectral bandwidth of the seed output from the oscillator is preferably greater than or equal to about 8 to 10 nm, although the bandwidth may be outside this range. As described herein, however, the fiber-based laser is preferred for compact packaging reasons. Other waveguide-based lasers are also possible and may yield compact designs as well.

As described more fully below, the oscillator 130, 150 or portions thereof may be packaged in a housing that provides a substantially stable support for optical elements. Such a housing preferably offers protection from the environment and improves performance stability of the optical devices. The packages may include fiber pigtail inputs and/or fiber pigtail outputs, which may be connected to other components. These pigtails may comprise single mode polarization maintaining fiber although other types of pigtail fibers may be employed. Some of the components in the laser system may also comprise optical fiber or fiber components that are not enclosed in a housing but that are spliced to the fiber pigtails.

FIGS. 3-9 now illustrate block diagrams of various possible ways of conditioning the seed pulse generated by the oscillator module. FIGS. 3A-C illustrate three exemplary embodiments of a basic modular design for producing high power and short pulses. As shown in FIG. 3A, one embodiment of a laser system 180 comprises an oscillator 182 coupled to an amplifier 186 via an isolator 184. The isolator 184 between the oscillator 182 and the amplifier 186 may comprise an independent modular component, or may include the fiber Bragg grating described above in reference to FIGS. 2A and B. In the latter case, at least a portion of the functional blocks of oscillator 182 and the isolator 184 may be physically packaged in a same module. The inclusion of the isolator is to provide a barrier to block any back reflection from the downstream back to the upstream such as oscillator or amplifier so as to maintain a stable operation, see FIG. 11C for detail. The output of the amplifier 186 is also coupled to a compressor module 190 via an isolator 188.

Figure 3A:
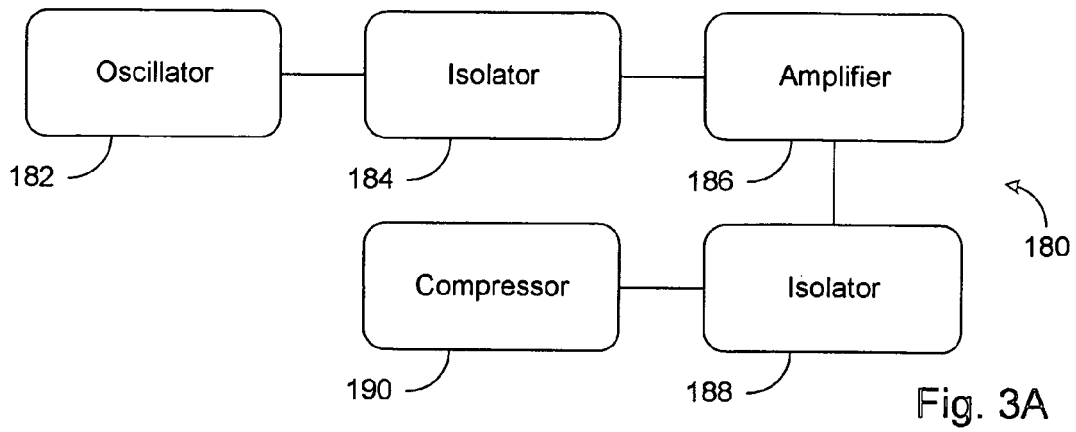
FIGS. 3A-C illustrate various exemplary combinations and arrangements of modular components of a laser for generating a high power short pulse output.
Figure 3B:
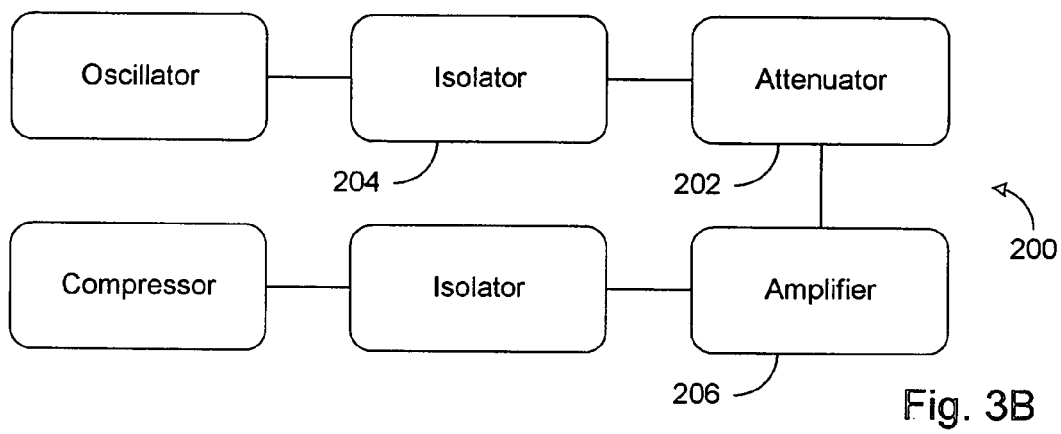

FIG. 3B illustrates another embodiment of a basic design of a laser system 200 comprising an oscillator 182 and an amplifier 206 with an attenuator 202 therebetween. This laser system 200 further comprises an isolator 204 between the oscillator and the amplifier. The attenuator 202 is disposed after the isolator 204 and before of the amplifier 206.

Figure 3C:
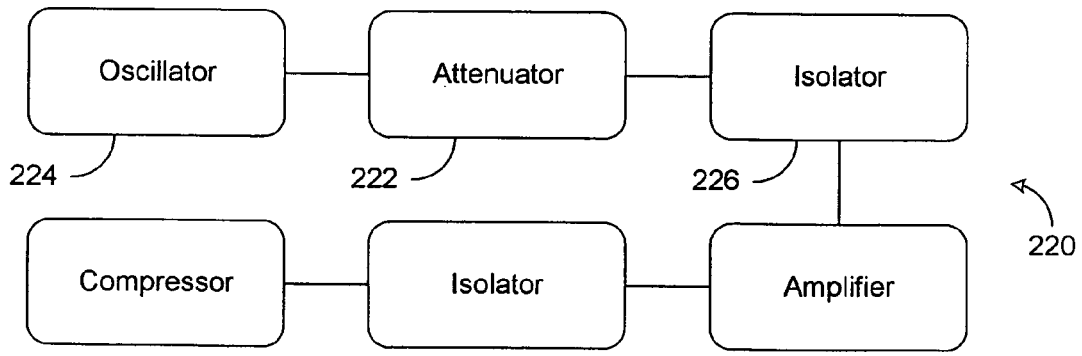

FIG. 3C illustrates another embodiment of a basic design of a laser system 220 also comprising an oscillator and an amplifier with an attenuator 222 therebetween. The attenuator 222 is disposed after the oscillator 224 and before the isolator 226.

Preferably the attenuator is a variable attenuator and has a variable transmission that can be controlled in the range of about 1~20 dB. Such variable attenuation can be advantageously employed in the manufacture and tuning of the laser systems.

Fiber amplifiers exhibit a variation in performance from to unit to unit. As a result, different amplifiers that are incorporated into the lasers during manufacturing may require different amplitude input pulses to provide similarly operating lasers. To accommodate such variation in amplifier performance, an adjustable attenuator such as shown in FIGS. 3B-3C may be included in the laser system. During fabrication of the laser, the components may be tested and the attenuator adjusted to provide a suitable amplitude for the optical pulse to the amplifier. In such a manner, substantially standardized laser performance can be achieved for a particular product.

Different measurements and analysis of these measurements may be employed to determine the suitable adjustment to the variable attenuator. For example, pulse power and/or pulse width may be measured or spectral measurements may be employed. Measurements may be obtained before or after the attenuator or at the output of the amplifier or the laser, or elsewhere. Other measurements may be used as well and likewise the measuring and evaluation techniques should not be limited to those recited herein. The attenuator, however, can be adjusted in response to such measurements.

Figure 11A:
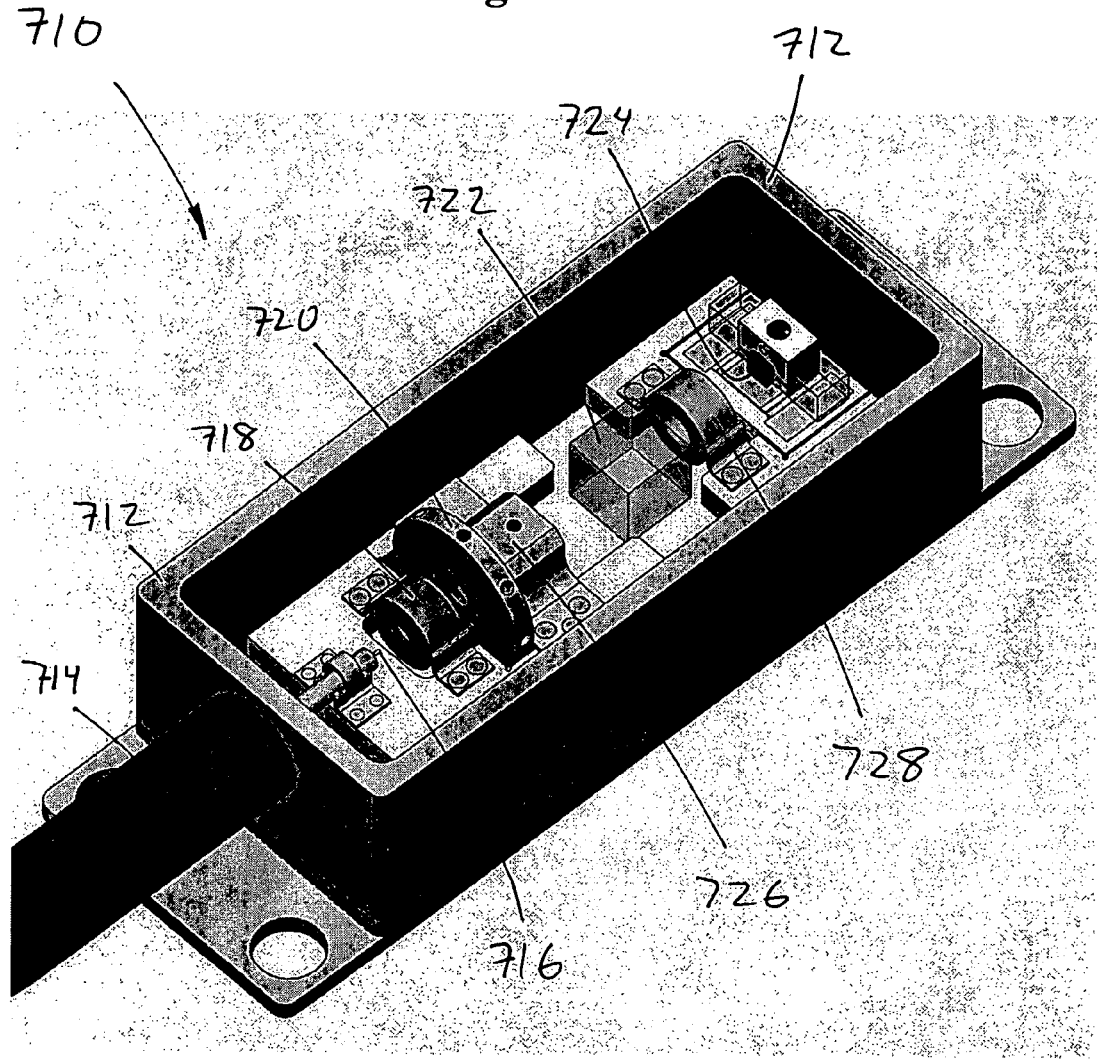
FIGS. 11A, B and C illustrate exemplary embodiments of the engineered modules including a saturable absorber module, an attenuator module and an isolator module.
Figure 11B:
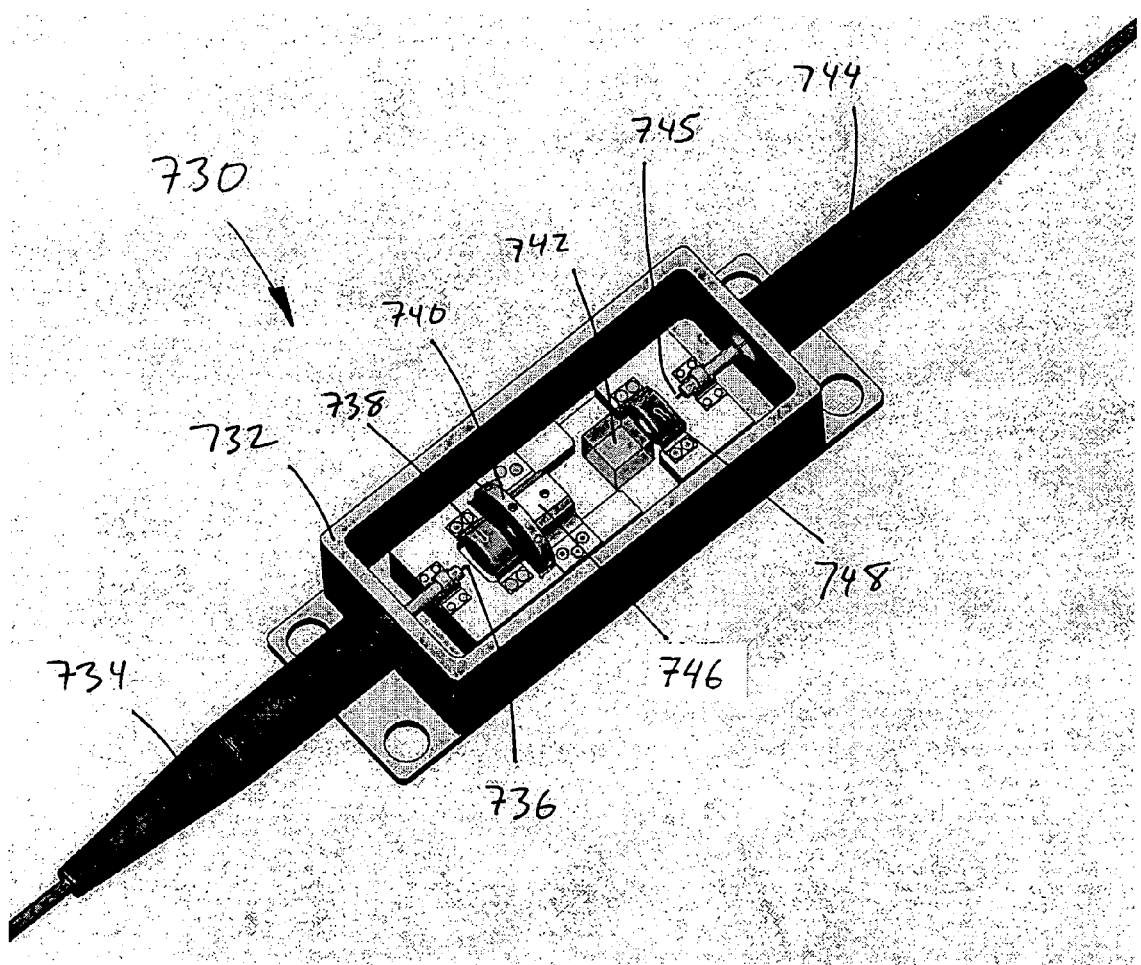
FIG. 11D illustrates one embodiment of the oscillator having one or more modular sub-components with a temperature control component.

This variable attenuator may comprise a rotatable waveplate and a polarization beamsplitter such as a MacNeille polarizer. The waveplate can be rotated to vary the distribution of light into orthogonal polarizations. The polarization beamsplitter can be used to direct a portion of the light out of the laser, depending on the state of the waveplate. Accordingly, a user, by rotating the waveplate and altering the polarization of light can control the amount of light reaching the amplifier and thereby adjust the system. Preferably, the waveplate and the MacNeille polarizer comprise micro-optics or are sufficiently small to provide for a compact laser system. These optical elements are also preferably packaged in a housing that may include fiber pigtail connections as shown in FIG. 11B. Lenses, mirrors, or other coupling elements may be employed to couple light from and to the pigtail inputs and outputs. The optics, e.g., waveplate, MacNeille polarizer, coupling lens, mirrors, etc., may be mounted to the housing to provide alignment and support. The housing may also provide protection from the environment and may be thermally insulating and possibly hermetically sealed. Preferably, however, the module formed by the optics and the housing are compact and rugged.

Other types of attenuator modules may alternately be employed. Variable attenuation need not be provided by a waveplate and a polarization selective optical element. Fiber or waveguide elements may be used as well. Such variable attenuation may be controlled manually or automatically. Various other designs are possible.

The system configuration may be varied as well. Pulse stretching need not always be incorporated in the laser system. For example, in a fiber amplifier system with sub-microjoule pulse energy, a few picosecond of seed pulse can be sufficiently long to reduce the nonlinear phase modulation in the amplifier fiber significantly. Thus, employment of a pulse stretcher in form of a long length of fiber or chirped fiber Bragg grating in generally may not necessarily be required in such a case.

In general, the preconditioning of the seed pulse property in the time-domain alone, e.g., stretching pulse width, is not always a suitable method for generating high quality amplified pulses. In a variety of cases, manipulation of the seed pulse by the seed pulse generator may readily provide sufficient degree of freedom for pulse recompression The outcome may not necessarily be the most preferred, however, depending on the target property of the recompressed pulses, such an approach significantly simplifies the technical complexity of the pulse controlling method.

Figure 4A:
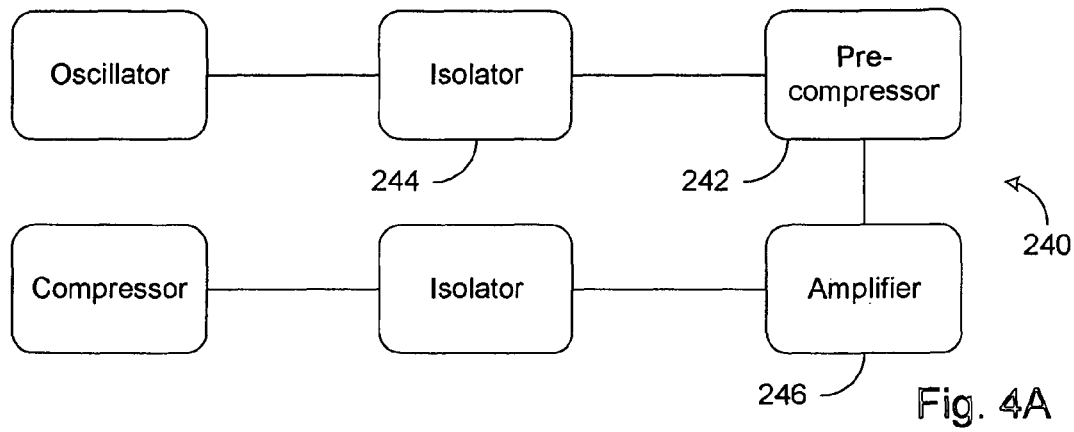
FIGS. 4A-C illustrate the use of a pre-compressor to shorten the seed pulse width prior to amplification in the exemplary modular lasers.
Figure 4B:
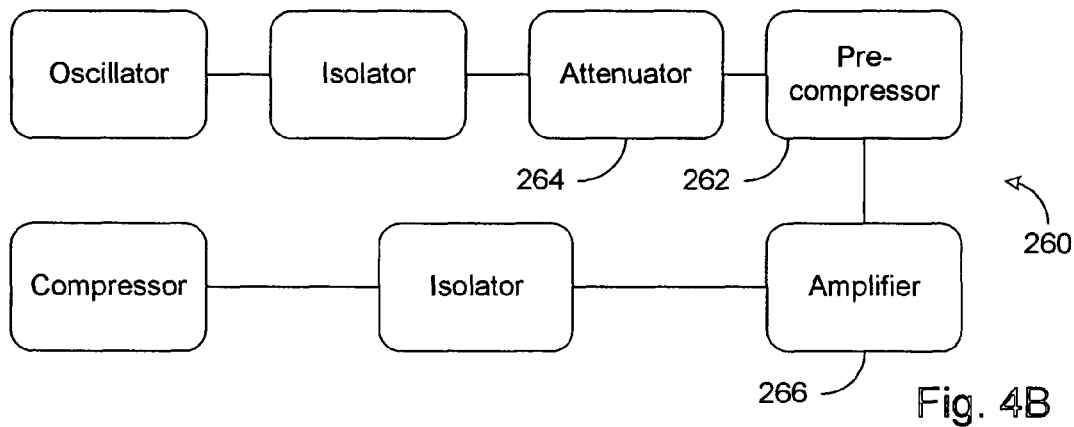
Figure 4C:
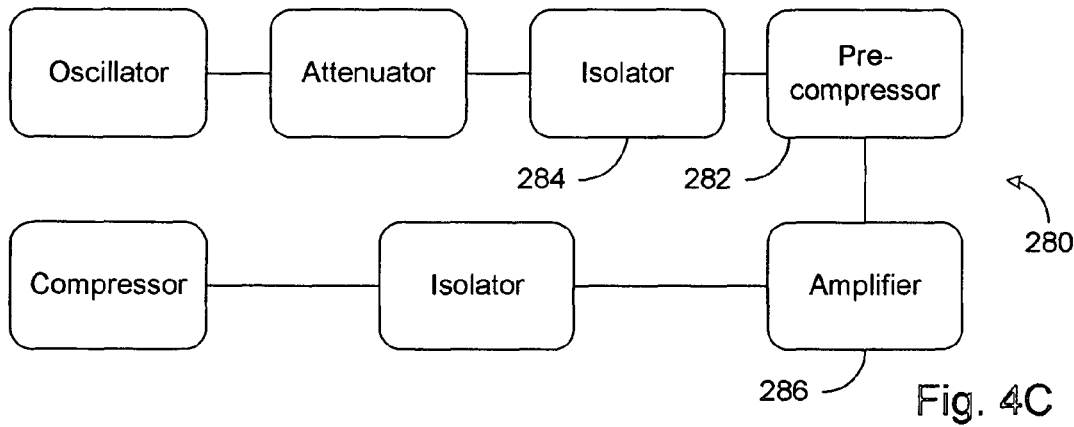

FIGS. 4A-C illustrate how an input seed to an amplifier can be further conditioned to improve the manner in which the laser system operates. For the purpose of description, the exemplary designs shown in FIGS. 4A-C build on the exemplary basic designs described above in reference to FIGS. 3A-C.

In general, the output pulse from an oscillator is delivered to an amplifier for higher power. As a result of the delivery fiber(s) between the oscillator and the amplifier, the pulse width may be stretched. For example, approximately 2 meters of delivery fiber may correspond to approximately 1 ps pulse width increase. A preferred seed pulse width, however, can be characterized as being less than approximately 1 ps.

To obtain a clean and shorter pulse after a compressor, several techniques can be used to preferably make the seed pulse width shorter prior to reaching the amplifier. One method is to pre-compress the seed pulse before injecting it into the amplifier. In one embodiment, use of a pre-compressing component can yield a pre-compressed seed pulse having a pulse width less than about 1 ps and preferably as low as approximately 150 fs. Such a pre-compressed seed pulse fed into the amplifier can yield an amplifier output having a spectral bandwidth that is greater than approximately 30 nm due to nonlinear effect. Such an amplifier output can be compressed by a compressor to yield a final pulse having a width of approximately 100 fs.

As shown in FIG. 4A, one embodiment of an exemplary laser system 240 is similar to the exemplary basic design of FIG. 3A. A modular pre-compressor component 242 is disposed in an optical path between an isolator 244 and an amplifier 246. The pre-compressor 242 pre-compresses pulses being output by the isolator 244 prior to being injected into the amplifier 246.

FIG. 4B illustrates one embodiment of an exemplary laser system 260 that is similar to the exemplary basic system of FIG. 3B and that includes an attenuator 264. A modular pre-compressor component 262 is disposed in an optical path between the attenuator 264 and an amplifier 266. The pre-compressor 262 pre-compresses pulses being output by the attenuator 264 prior to being injected into the amplifier 266.

FIG. 4C illustrates one embodiment of an exemplary laser system 280 that is similar to the exemplary basic system of FIG. 3C. A modular pre-compressor component 282 is disposed in an optical path between an isolator 284 and an amplifier 286. The pre-compressor 282 pre-compresses pulses being output by the isolator 284 prior to being injected into the amplifier 286.

The pre-compressor may comprise bulk, fiber, or other waveguide optics. Examples of components that may comprise the pre-compressor module include a bulk grating pair, a single grating (e.g., bulk or waveguide), a prism pair, etc. Fiber components such as chirped fiber Bragg gratings may also be employed. Other fiber and non-fiber components may be employed as well. In some embodiments, the components are encapsulated in a housing that provides for substantially stable mounting therein, as well as protection from the environment. The housing may further comprises a fiber pigtail input and/or a fiber pigtail output. Such pigtail fibers can be spliced in a manner described above.

Figure 5A:
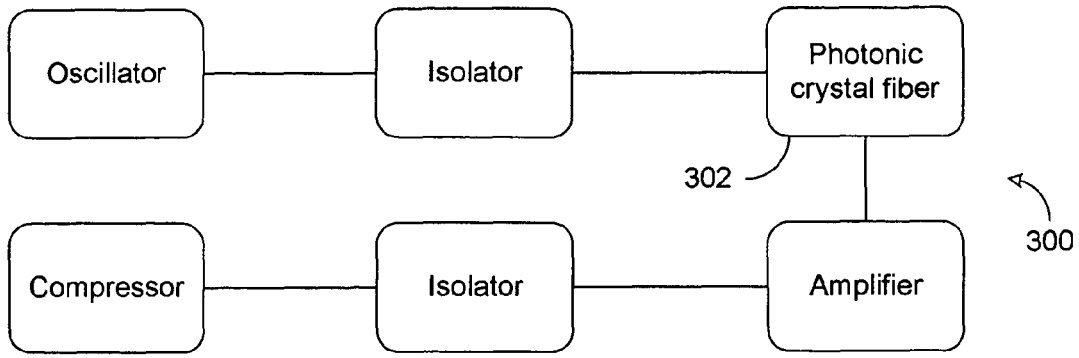
FIGS. 5A-C illustrate the use of a photonic crystal fiber as a pre-compressor.
Figure 5B:
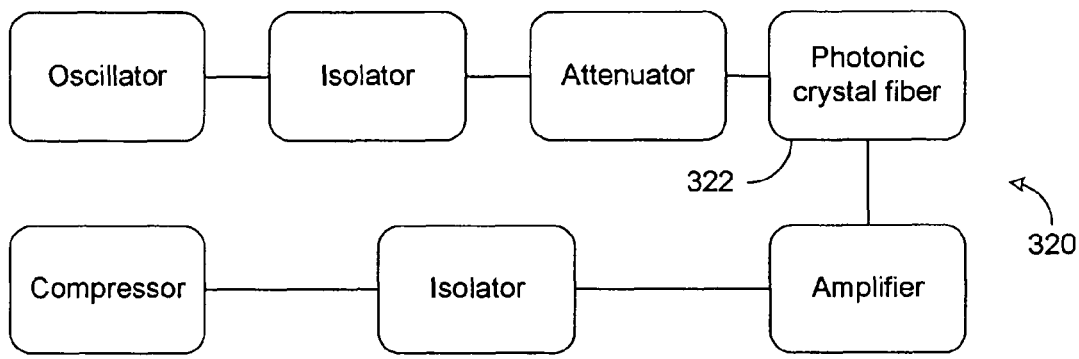
Figure 5C:
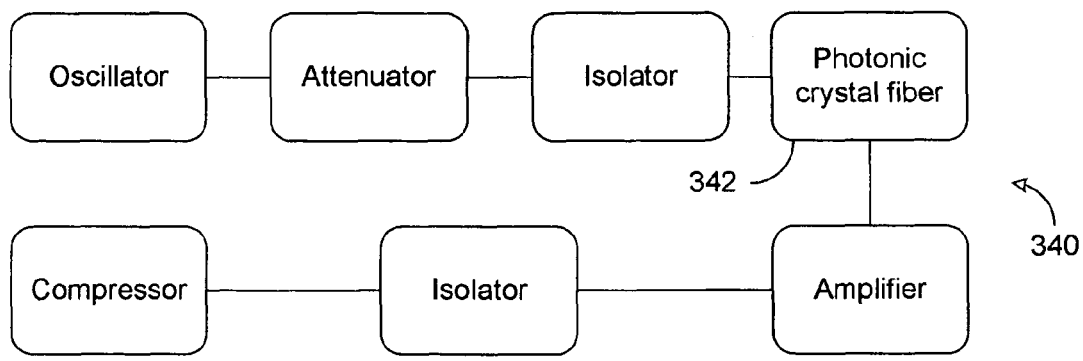

FIGS. 5A-C now illustrate the use of a photonic crystal fiber as a pre-compressor. Photonic crystal fibers may be tailored to control their dispersion and to provide negative dispersion at the operating wavelength. In one embodiment, a short piece of a photonic crystal can result in the injection seed pulse (into the amplifier) being compressed to a femtosecond regime. Advantageously, the photonic crystal fiber, due to its fiber nature, can be incorporated conveniently into a laser system having other fiber based components such as by splicing, providing a seamless connection in a compact and rugged configuration.

FIG. 5A illustrates one embodiment of an exemplary laser system 300 that is similar to the exemplary laser system of FIG. 4A. The pre-compressor comprises a photonic crystal fiber 302 that is disposed in an optical path between the isolator and the amplifier.

FIG. 5B illustrates one embodiment of an exemplary laser system 320 that is similar to the exemplary laser system of FIG. 4B and includes an attenuator. The pre-compressor comprises a photonic crystal fiber 322 that is disposed in an optical path between the attenuator and the amplifier.

FIG. 5C illustrates one embodiment of an exemplary laser system 340 that is similar to the exemplary laser system of FIG. 4C and also includes an attenuator. The pre-compressor, however, comprises a photonic crystal fiber 342 that is disposed in an optical path between the isolator and the amplifier.

Figure 6A:
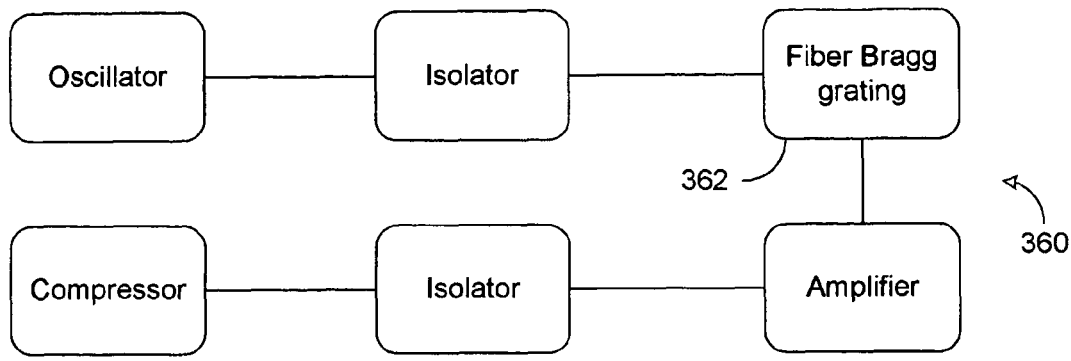
FIGS. 6A-C illustrate the use of a fiber Bragg grating as a pre-compressor.
Figure 6B:
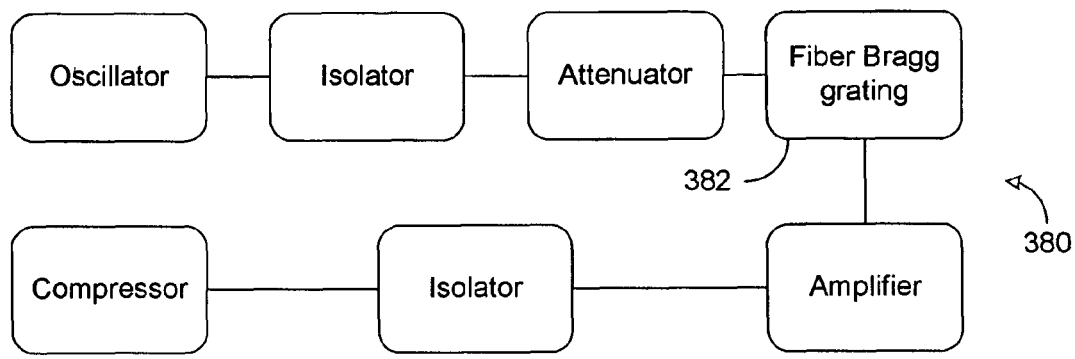
Figure 6C:
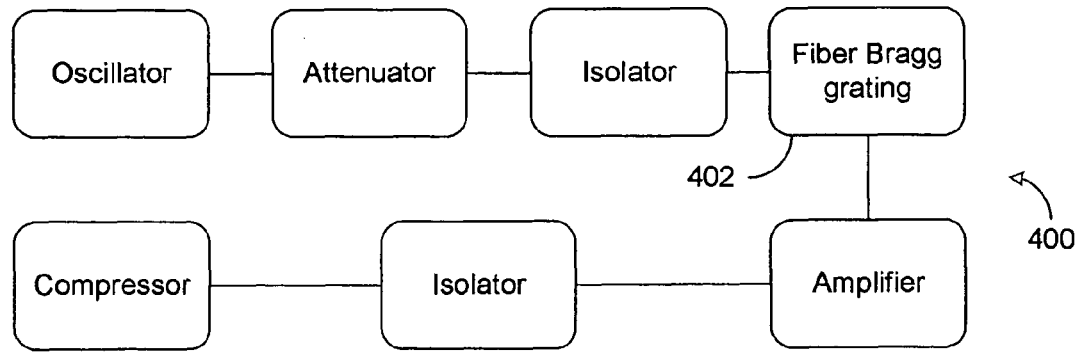

FIGS. 6A-C illustrate the use of a fiber Bragg grating as a pre-compressor. Advantageously, the fiber Bragg grating, due to its fiber nature, can be incorporated conveniently into a laser system having other fiber based components.

FIG. 6A illustrates one embodiment of an exemplary laser system 360 that is similar to the exemplary laser system of FIG. 4A. The pre-compressor comprises a fiber Bragg grating 362 that is disposed in an optical path between the isolator and the amplifier.

FIG. 6B illustrates one embodiment of an exemplary laser system 380 that is similar to the exemplary laser system of FIG. 4B and comprises an attenuator. The pre-compressor comprises a fiber Bragg grating 382 that is disposed in an optical path between the attenuator and the amplifier.

FIG. 6C illustrates one embodiment of an exemplary laser system 400 that is similar to the exemplary laser system of FIG. 4C and also comprises an attenuator. The pre-compressor comprises a fiber Bragg grating 402 that is disposed in an optical path between the isolator and the amplifier.

The nonlinearity in the amplifier can be a result of an interplay of different factors, such as gain shaping, inhomogeneous self-phase modulation, and higher order dispersion. Such factors can be highly sensitive to the spectral position within the whole pulse spectrum. One way to control these factors and thereby control the nonlinearity in the amplifier is to manipulate the spectrum being output from the oscillator. In one embodiment, a bandpass filter is used to select a portion of the oscillator spectrum to be amplified. At the same time, the filter can shorten the pulse width of the seed.

In various embodiments, bandpass, highpass, or lowpass filters may be employed to spectrally narrow and control a spectral power distribution of an optical output from the oscillator. Preferably, the filter has spectral transmission with a band edge that overlaps the spectral power distribution of the output pulses from the oscillator. The bandpass filter thereby attenuates a portion of the spectral power distribution and reduces the spectral bandwidth. The pulse width of the optical pulses coupled from the oscillator to the fiber amplifier are thereby reduced. Preferably, the resultant spectral bandwidth is between about 5 and 12 nm and preferably less than about 10 nm but may be outside this range.

The spectral filter may comprise, for example, a fiber or other waveguide devices such as a planar waveguide element or may comprise bulk optics. Examples of spectral filters include gratings, etalons, thin film coatings, etc. Preferably, the filter comprises micro-optics. In various preferred embodiments, the filter comprises a fiber elements such as a fiber Bragg grating that can be readily physically connected to a fiber based system in a compact robust manner. Other types of filters and configurations for providing spectral filtering may also be employed.

Figure 7A:
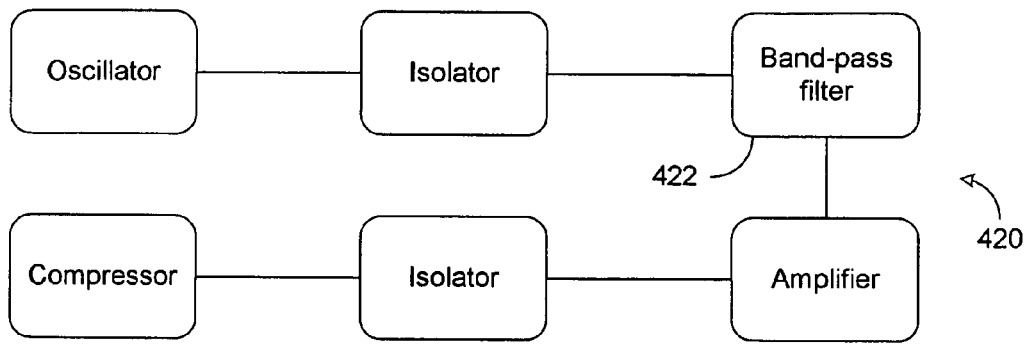
FIGS. 7A-C illustrate the use of a band-pass filter to select a part of the oscillator output spectrum and shorten the seed pulse prior to amplification.
Figure 7B:
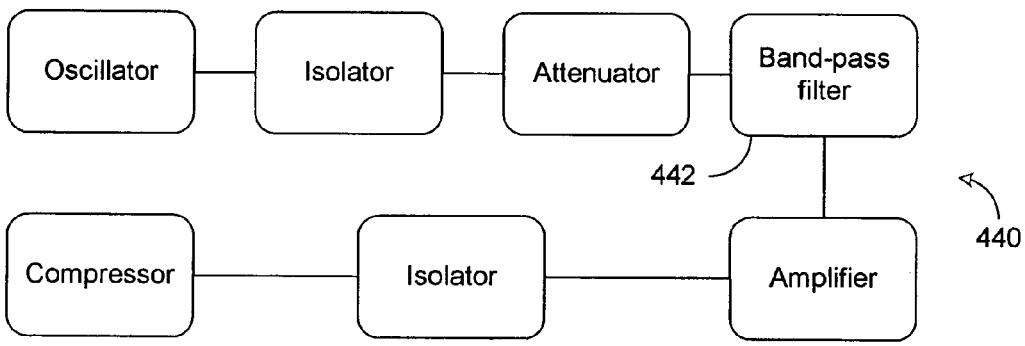
Figure 7C:
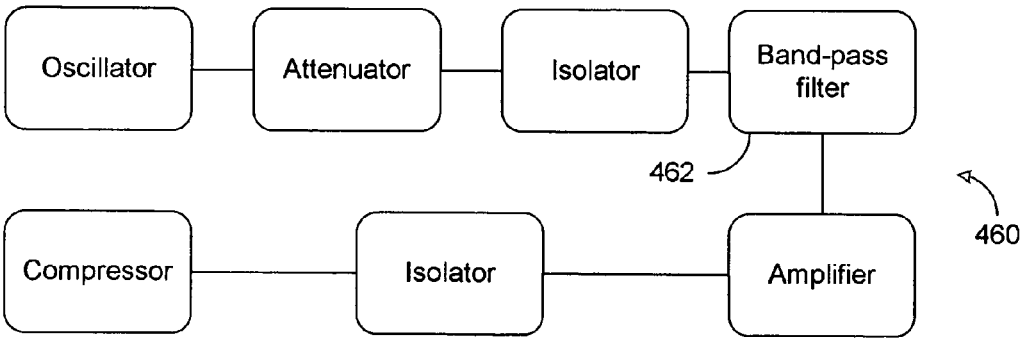

FIGS. 7A-C illustrate the use of a bandpass filter as a spectrum selector/pre-compressor for the exemplary designs similar to that of FIGS. 4A-C.

FIG. 7A illustrates one embodiment of an exemplary laser system 420 that is similar to the exemplary laser system of FIG. 4A. The spectrum selector/pre-compressor comprises a bandpass filter 422 that is disposed in an optical path between the isolator and the amplifier.

FIG. 7B illustrates one embodiment of an exemplary laser system 440 that is similar to the exemplary laser system of FIG. 4B and that includes an attenuator. The spectrum selector/pre-compressor comprises a bandpass filter 442 that is disposed in an optical path between the attenuator and the amplifier.

FIG. 7C illustrates one embodiment of an exemplary laser system 460 that is similar to the exemplary laser system of FIG. 4C and also includes an attenuator. The spectrum selector/pre-compressor comprises a bandpass filter 462 that is disposed in an optical path between the isolator and the amplifier.

The position of the spectral filter is not limited to the locations shown herein. Preferably, however, the spectral filter is disposed in an optical path between the oscillator and the amplifier.

Figure 8:
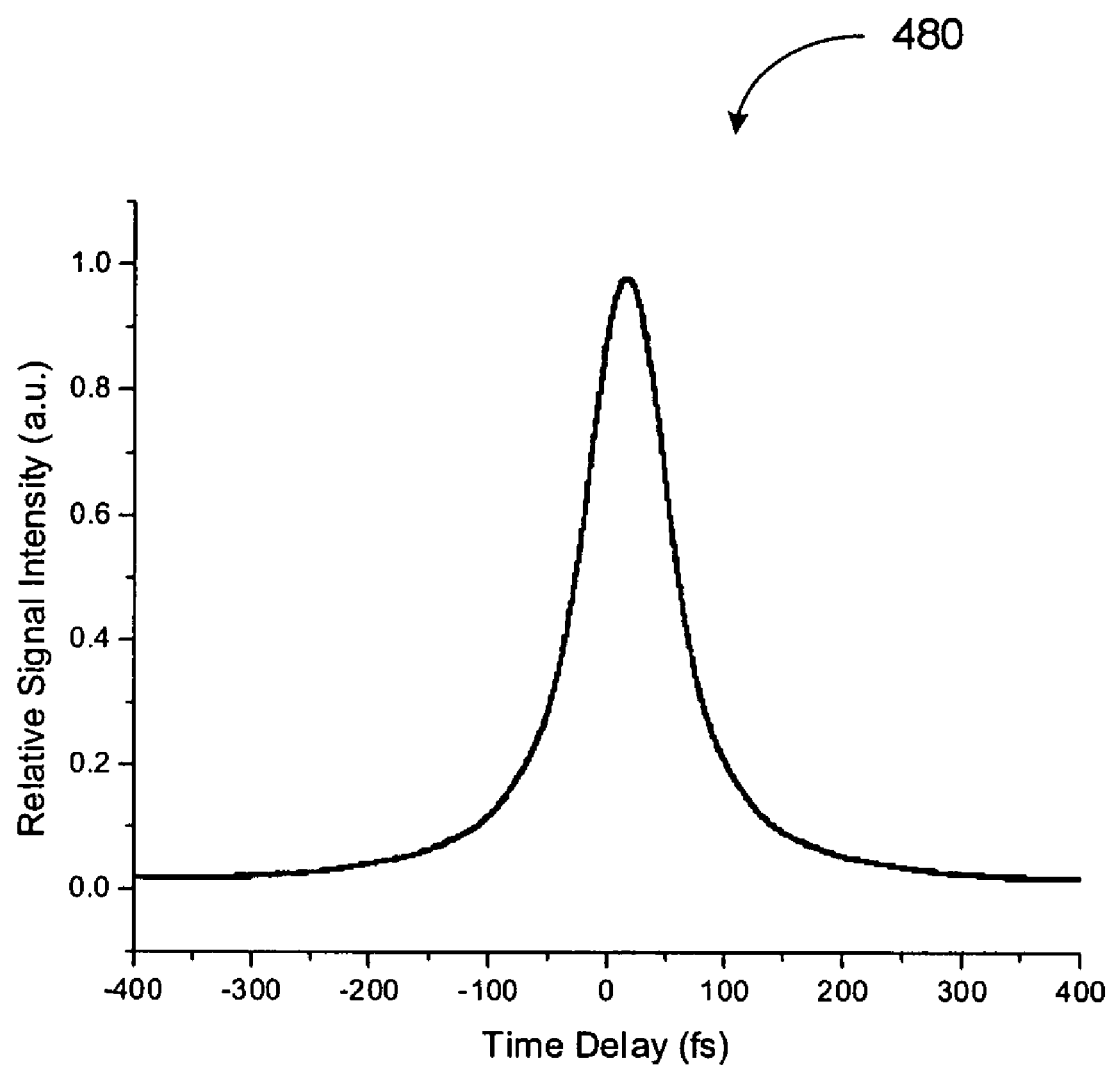
FIG. 8 illustrates an exemplary sub-100 fembosecond (fs) pulse generated with use of the band-pass filter upstream of the amplifier.

FIG. 8 illustrates an exemplary pulse 480 generated by a laser system using the bandpass filter described above in reference to FIGS. 7A-C. In one embodiment, the oscillator output has a bandwidth of approximately 12 nm. Halving the seed spectral bandwidth from approximately 12 nm to approximately 6 nm with a bandpass filter can result in the selected pulse width also being halved from approximately 1.3 ps to approximately 700 fs. By using a bandpass filter with a narrow bandwidth or a tilt filter, even shorter pulses can be achieved without compressor elements. The exemplary pulse 480 output from the compressor, has a width of approximately 88 fs.

As an alternative to a free space bandpass filter, a fiber band pass filter such as a long-period fiber grating can be used to select a part of the oscillator output signal in both wavelength domain and time domain. A long-period fiber grating (LPG) couples the light from a fundamental guided mode to forward-propagating cladding modes. A pair of matched LPGs can be used. One LPG couples light from the fundamental mode to the cladding mode and one LPG couples light back from the cladding mode to the fundamental mode. The cladding can thereby be used as a bypass for the resonant light while the non-resonant light propagating in the core is substantially blocked. Alternatively, by introducing a π-phase shift in the approximate middle of a LPG during its fabrication, a bandpass filter can be made using only one LPG. The π-phase shift in the LPG reverses the coupling direction such that light coupled into the cladding mode can return into the fundamental mode. One advantage of using an LPG as a bandpass filter is that the transmission spectrum can be conveniently designed so as to be suitable for a given amplifier operation.

Figure 9A:
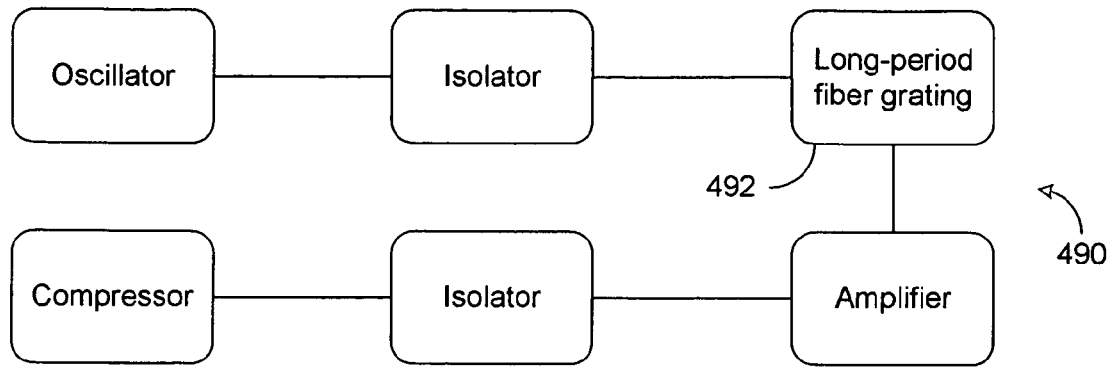
FIGS. 9A-C illustrate the use of a long period fiber grating to select a part of the oscillator output spectrum and shorten the seed pulse prior to amplification.
Figure 9B:
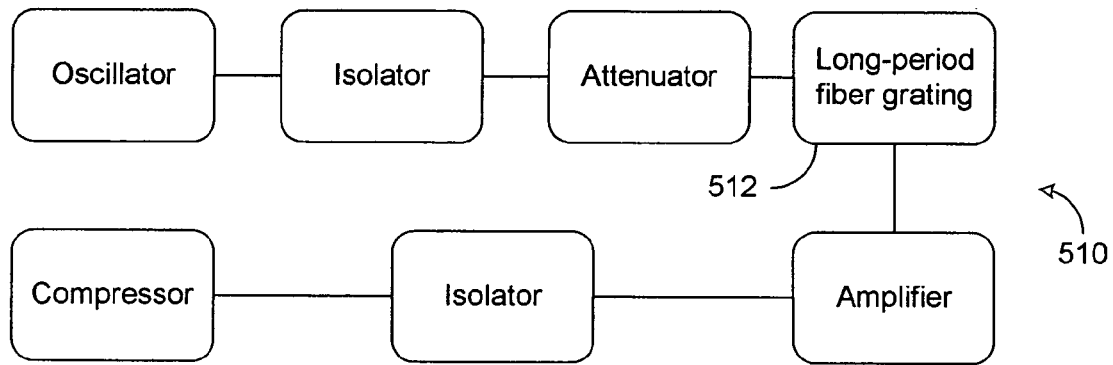
Figure 9C:
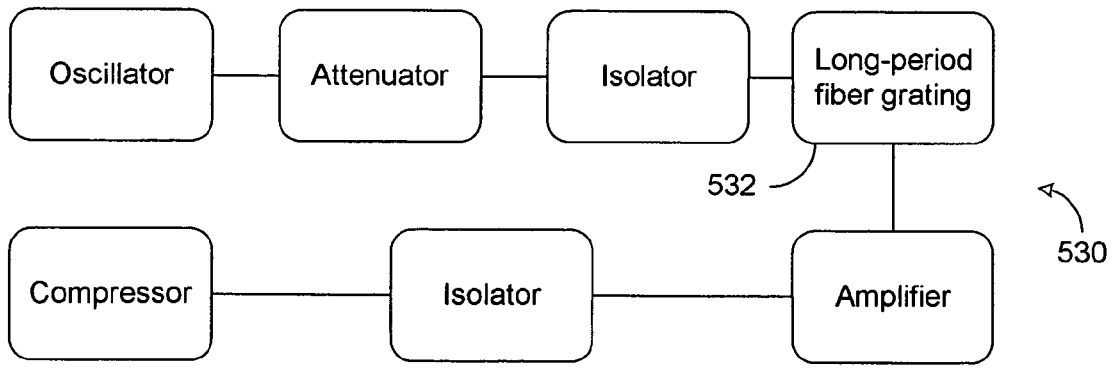

FIGS. 9A-C illustrate the use of a long-period fiber grating (LPG) as a spectrum selector/pre-compressor for the exemplary designs similar to that of FIGS. 4A-C.

FIG. 9A illustrates one embodiment of an exemplary laser system 490 that is similar to the exemplary laser system of FIG. 4A. The spectrum selector/pre-compressor comprises an LPG 492 that is disposed in an optical path between the isolator and the amplifier.

FIG. 9B illustrates one embodiment of an exemplary laser system 516 that is similar to the exemplary laser system of FIG. 4B and that comprises an attenuator. The spectrum selector/pre-compressor comprises an LPG 512 that is disposed in an optical path between the attenuator and the amplifier.

FIG. 9C illustrates one embodiment of an exemplary laser system 530 that is similar to the exemplary laser system of FIG. 4C and that also comprises an attenuator. The spectrum selector/pre-compressor, however, comprises an LPG 532 that is disposed in an optical path between the isolator and the amplifier.

The spectral manipulation can be achieved with a spectral filter that provides a band selectivity and/or a spectral shape modification. The band selectivity can provide a proper selection of the seed spectrum (e.g. position and bandwidth). The position may range from about 1045 to 1055 nm and the bandwidth may range from about 5 to 12 nm in certain embodiments although these ranges should not be construed as limiting as other embodiments are possible. The selected band may be matched with the gain shaping and nonlinear phase distortion in the amplifier for an improved pulse compressibility. The proper spectral shape, such as Gaussian or flat-top or other profile, can also be tailored with a spectral shaping filter. This concept can be further extended to an actively or passively controlled "pedestal flattening filter".

Figure 10:
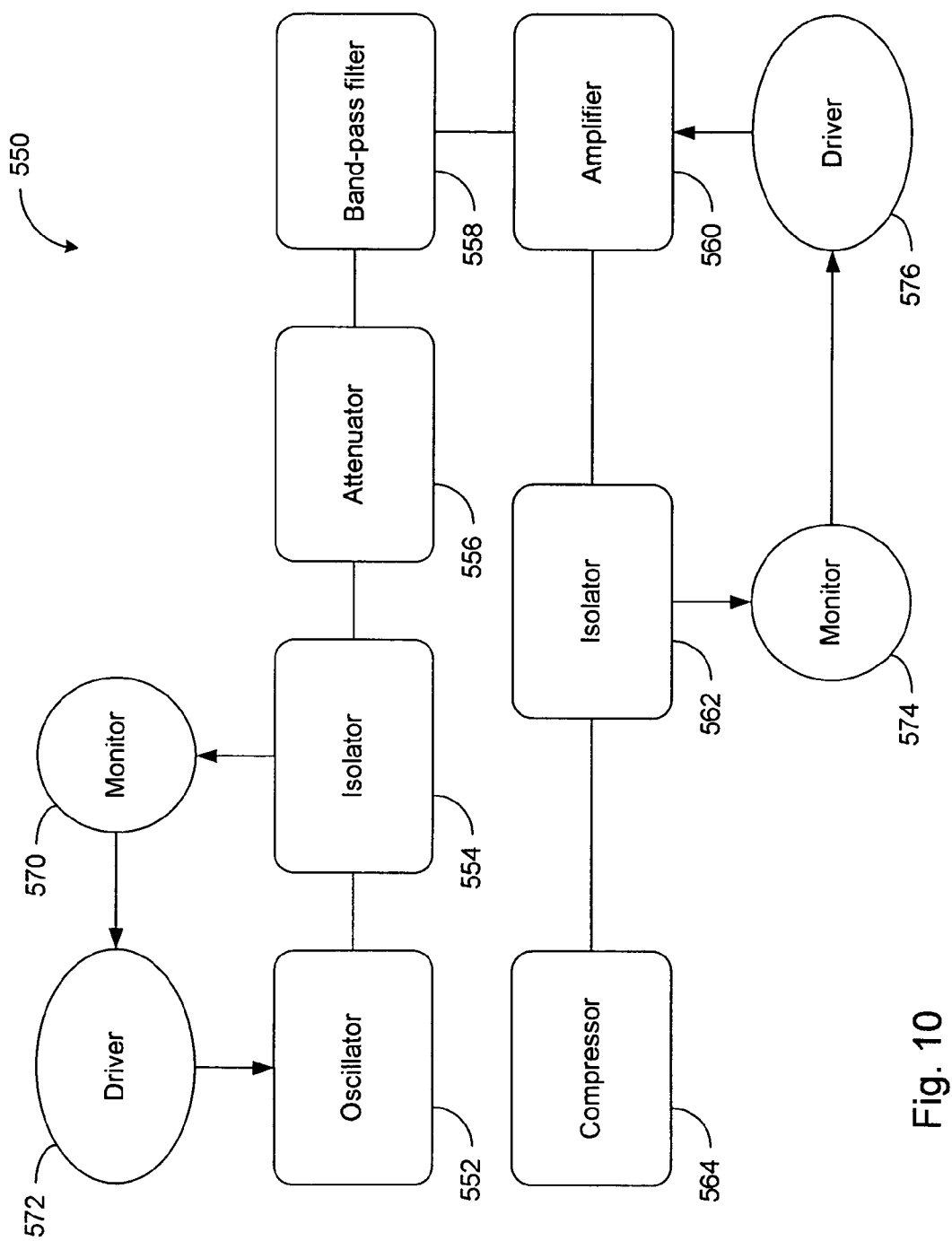
FIG. 10 illustrates a exemplary laser system having one or more tap and feedback components to monitor the performance of the system and actively control the system for stable operation.

FIG. 10 illustrates one embodiment of a laser system 550 having a monitoring and feedback control capability. A rare-earth-doped fiber absorption depends heavily on the environmental temperature. Such a dependence can result in a laser performance drift with temperature. For example, the oscillator modelocking threshold typically increases at high temperature.

In one embodiment of the laser system, monitoring the performance such as output power at some point(s) of the system and providing feedback to the diode pump drivers for active control can achieve a stable operation. FIG. 10 illustrates one embodiment of a laser system 550 having such a monitoring and feedback feature. The exemplary laser system 550 comprises an oscillator 552 coupled to an attenuator 556 via an isolator 554. The output from the attenuator 556 is fed into a bandpass filter 558 whose output is then direct to an amplifier 560. The output from the amplifier 560 is fed into a compressor 564 via an isolator 562. It should be noted that the use of the attenuator 556 and the bandpass filter 558 are exemplary, and that either of these components may be excluded and any other modular components, including those disclosed herein, may be used in the laser system having the feedback.

As shown in FIG. 10, the laser system 550 further comprises a first monitor component 570 that monitors a performance parameter of the system after the oscillator 552. The monitor 570 may comprise a sensor and controller. The monitor 570 may issue adjustment commands to a first driver 572 that implements those adjustment commands at the oscillator 552.

The exemplary laser system 550 is shown to further comprise a second monitor component 574 that monitors a performance parameter of the system after the amplifier 560. The monitor 574 may similarly comprise a sensor and controller. The monitor 574 can then issue adjustment commands to a second driver 576 that implements those adjustment commands at the amplifier 560.

The monitoring of the system performed by the exemplary monitors 570 and/or 574 may comprise for example an optical detector and electronics that monitors optical intensity or power or other relevant parameter such as, e.g., frequency and spectrum. In response to such measurement, the monitor and the driver may induce changes in the oscillator and/or the amplifier by for example adjusting the pump intensity and/or rate, or adjusting the operating temperature. Exemplary embodiments that include temperature control of the oscillator are described more fully below. Temperature control of the oscillator can stabilize the gain dynamics as well as frequency fluctuations. Temperature control of the amplifier can also be used to stabilize the gain dynamics.

Other configurations for providing feedback to control the operation of the laser system may also be employed. For example, more or less feedback loops may be included. The loops may involve electronics that perform operations such as calculations to determine suitable adjustments to be introduced. The feedback may be obtained from other locations in the system and may be used to adjust other components as well. The embodiments described in connection with FIG. 10 should not be construed to limit the possibilities.

In the description of various exemplary designs presented in reference to FIGS. 3-10, various components are depicted as modules. These modules may indeed be independent modular components. Other configurations, however, are possible. For example, two or more of these components may be packaged together in an integrated module. Alternatively, modules that may in some embodiments include one or more optical element, may be broken-up and/or separated and included in separate modules.

In one embodiment, an isolator depicted, for example, in FIGS. 3A-3C as being downstream from an oscillator may comprise a fiber Bragg grating, and may be packaged together with the oscillator. The isolator is thereby merged with the oscillator. Similarly, various components that may be considered separate functional groups may be included in the same housing and support structures. For example, the amplifier may comprise a non-fiber element such as a solid state or planar waveguide amplifier and may be included on the same platform and encased in the same housing as isolator optics thereby merging the amplifier and isolator functionalities. Separation of the functionalities, however, may offer advantages and thus be preferred in some embodiments.

Figure 11C:
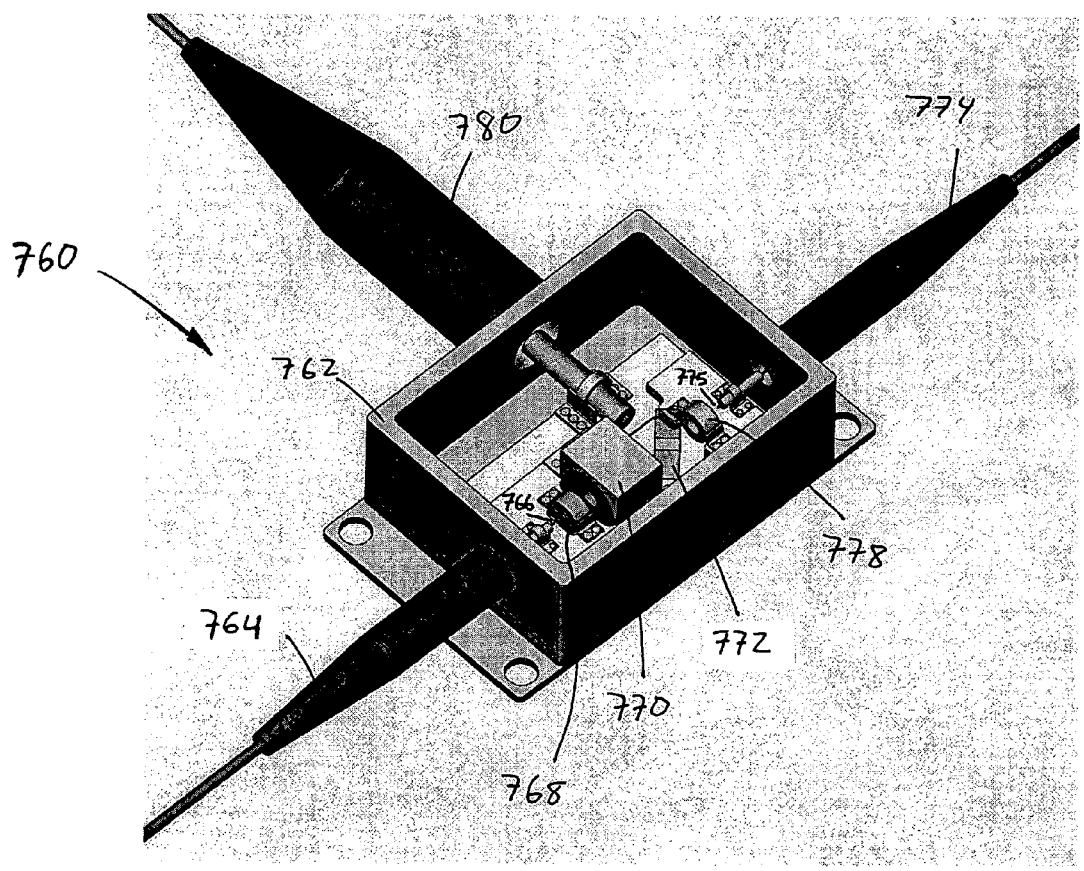

The modular design concept can also be further extended to the elements within the oscillator, amplifier, and other components comprising the laser system. FIGS. 11A-C illustrate exemplary embodiments that can be designed and packaged with the advantageous modular approach of the present teachings.

FIG. 11A illustrates one embodiment of a saturable absorber module 710 packaged following Telcordia specifications. The saturable absorber module 710 comprises a housing 712 that contains a plurality of optical elements. An optical fiber connector 714 comprising an optical fiber 716 having an angle polished or cleaved endface passes through one side of the housing 712 into an inner region of the housing containing the plurality of optical components. These optical components include a first lens 718 for collecting and preferably collimating light output from the optical fiber 716, a variable waveplate 720 and a polarization selective optical element 722 as well as a saturable absorber 724. The variable waveplate 720 comprises a rotatable waveplate mounted on a rotatable wheel 726 and the polarization selective optical element 722 comprises a polarization beamsplitter such as a MacNeille prism. A second lens 728 disposed between the polarization selective optical element 722 and the saturable absorber 724 preferably focuses light propagating through the waveplate 720 and the polarization beamsplitter 722 onto the saturable absorber. An optical path is formed from the optical fiber 716 through the waveplate 720 and prism 722 to the saturable absorber 724, which is reflective. Light will propagate in both directions along this optical path, which may form a portion of the resonantor of the oscillator.

In various preferred embodiments, the light in the laser is linearly polarized. The degree of the linear polarization may be expressed by the polarization extinction ratio (PER), which corresponds to a measure of the maximum intensity ratio between two orthogonal polarization component. In certain embodiments, the polarization state of the source light may be maintained by using polarization-maintaining single-mode fiber. For example, the pigtail of the individual modular device may be fabricated with a polarization-maintaining fiber pigtail. In such cases, the PER of each modular stage may be higher than about 23 dB. Ensuring a high polarization extinction ratio throughout a series of modules challenges despite the use of single mode polarization maintaining fiber. Degradation of the PER can occur at fiber ferrule, fiber holder, or fusion splice in the series of modules.

Levels of PER above 23 dB may be obtained using linear-polarizing optical components in the modules, such as shown in FIG. 11A wherein the polarization beamsplitter 722 operates as a polarization filter thereby providing a substantially linear polarization. The rotatable waveplate 720 adjusts the polarization output from the fiber 716 preferably to reduce the amount of light that is filtered out and lost by the polarization beamsplitter 722. In other embodiments, the optical fiber 716 may be rotated to alter the polarization instead of or in addition to adjustment of the rotatable waveplate 720.

Use of linear-polarizing components in the modules that contain polarization degrading elements such as fiber ferrule, fiber holder, or fusion splice is advantageous. The linear polarizers counter the superposition of the phase shift from each polarization degrading element. A superposed phase shift of 10 degrees may reduce the PER to about 15 dB in which case intensity fluctuation through a linear polarizer might be more than about 4%. In contrast, by embedding linear polarizers throughout the series of modules, the PER of the aggregate system can be substantially controlled such that the intensity fluctuation is below about 1%, provided that the PER of the individual module and splice is above about 20 dB.

Preferably, the optical elements such as the first lenses 718, the rotatable waveplate 720, the MacNeille polarizer 722, and the saturable absorber 724 comprise micro-optics or are sufficiently small to provide for a compact module. The elements in the housing 712 are also preferably securely fastened to a base of the housing such as by laser welding. The housing 712 may be sealed and thermally insulated as well. In various preferred embodiments, these modules conform to Telcordia standards and specifications.

FIG. 11B illustrates one embodiment of a variable attenuator module 730 comprising a housing 732 that contains optical components for providing a controllable amount of optical attenuation. A first optical fiber connector 734 comprising an optical fiber 736 having an angle polished or cleaved endface passes through one sidewall of the housing 732 into an inner region of the housing containing the plurality of optical components. These optical components include a first lens 738 for collecting and preferably collimating light output from the optical fiber 736, a variable waveplate 740 and a polarization selective optical element 742. A second optical fiber connector 744 comprising an optical fiber 745 having an angle polished or cleaved endface passes through another sidewall of the housing 732 into the inner region containing the optical components. The variable waveplate 740 comprises a rotatable waveplate mounted on a rotatable wheel 746 and the polarization selective optical element 742 comprises a polarization beamsplitter such as a MacNeille prism. A second lens 748 disposed between the polarization selective optical element 742 couples light between the polarization beamsplitter 742 and the second optical fiber 745. An optical path is formed from the first optical fiber 736 through the waveplate 740 and prism 742 to the second optical fiber connector 744.

The waveplate 740 can be rotated to vary the distribution of light into orthogonal polarizations. The polarization beamsplitter 742 can be used to direct a portion of the light out of the optical path between the first and second fiber connectors 734, 744, depending on the state of the waveplate 740. Accordingly, a user, by rotating the waveplate 740 and altering the polarization of light can control the amount of light coupled between the first and second optical fiber connectors 734, 744 and thereby adjust the level of attenuation.

Preferably, the optical elements such as the first and second lenses 738, 748, the rotatable waveplate 740 and the MacNeille polarizer 742 comprise micro-optics or are sufficiently small to provide for a compact module. The elements in the housing 732 may be laser welded or otherwise securely fastened to a base of the housing. The housing 732 may be sealed and thermally insulated as well. In various preferred embodiments, these modules conform to Telcordia standards and specifications.

FIG. 11C illustrates one embodiment of an isolator module 760 comprising a housing 762 that contains optical components for providing a optical isolation. A first optical fiber connector 764 comprising an optical fiber 766 having an angle polished or cleaved endface passes through one sidewall of the housing 762 into an inner region of the housing containing the plurality of optical components. These optical components include a first lens 768 for collecting and preferably collimating light output from the optical fiber 766, an optical isolator 770, and a beamsplitter 772. A second optical fiber connector 774 comprising an optical fiber 775 having an angle polished or cleaved endface passes through another sidewall of the housing 762 into the inner region containing the optical components. The isolator 770 may comprise for example a Faraday rotator and linear polarizers (not shown). The beamsplitter 772 may comprise a plate or wedge that directs a portion of the beam to a third fiber connector 780. In other embodiments, a lens may couple light between the beamsplitter 772 and this third fiber connector 780. The third fiber connector 780 may comprise a tap for tapping off a portion of the light propagating between the first optical fiber 766 and the second optical fiber 775 and is not generally involved in the operation of the isolator 770. Accordingly, the beamsplitter 772 and tap 780 may be excluded from other embodiments of the isolator module design. The tap 780, however, may be useful for providing feedback for laser systems as described elsewhere herein. A second lens 778 disposed between the beamsplitter 772 and the second optical fiber 775 couples light between the beamsplitter 772 and the second optical fiber. An optical path is formed from the first optical fiber 766 through the isolator 770 and beamsplitter 772 to the second optical fiber connector 774. This optical path, however, is substantially unidirectional as a result of the isolator 770.

This module 760 may further comprise a waveplate and a polarization selective optical element to assist in maintaining polarization as described in connection with the saturable absorber module 710 shown in FIG. 11A. In other embodiments, e.g., containing a polarization selective element such as a linear polarizer, the optical fibers may be rotated to alter the polarization instead of or in addition to providing a rotatable waveplate.

Preferably, the optical elements such as the first and second lenses 768, 778, the isolator 770 and the prism 772 comprise micro-optics or are sufficiently small to provide for a compact module. The elements in the housing 762 may be laser welded or otherwise securely fastened to a base of the housing. The housing 762 may be sealed and thermally insulated as well. In various preferred embodiments, these modules conform to Telcordia standards and specifications.

Other designs may be employed that differ from the design configurations depicted in connection with the modules 710, 730, 760 shown in FIGS. 11A-11C. For example, other components may be added, alternative components may be used, or the arrangement and configuration of the components in the modules may be different. In some cases, components may be removed. The housing may also be different. Still other variations are possible.

Figure 11D:
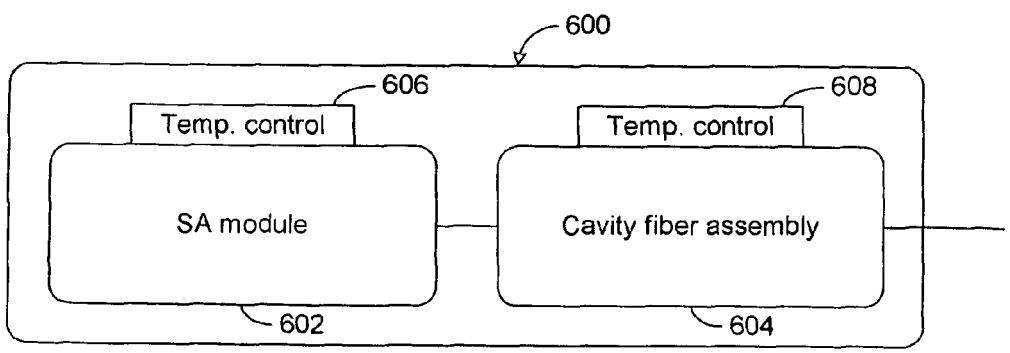

FIG. 11D depicts an exemplary schematic representation of an oscillator such as described above in reference to FIGS. 2A and 2B. In one embodiment, an oscillator 600 comprises a saturable absorber module 602 optically coupled to a cavity fiber assembly module 604. The two modules can be optically coupled by a fiber pigtail, and the length of the fiber between the modules 602, 604 can be varied to contribute to a desired group delay dispersion in the cavity.

The saturable absorber module 602 and/or the cavity fiber assembly module 604 may be coupled to respective temperature control components 606 and 608. In one embodiment, the temperature control components 606 and 608 comprise Peltier elements that provide a temperature control over a relatively large range of temperatures. The temperature controllers can be used, for example, to adjust the temperature of the gain fiber in the oscillator to stabilize gain and reduce noise.

Figure 12:
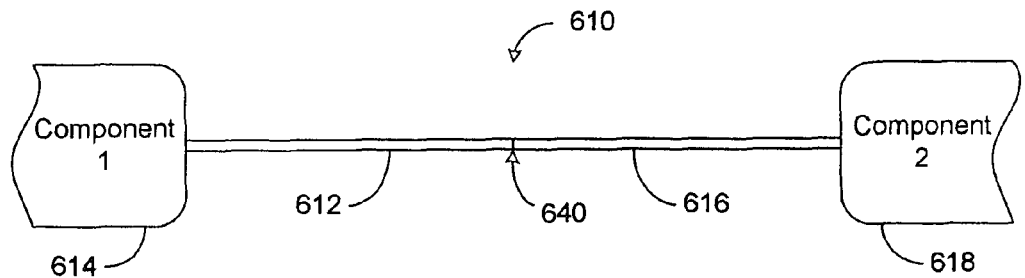
FIG. 12 illustrates how two exemplary components or modules can be optically coupled by splicing of fiber pigtails.

FIG. 12 illustrates one approach to optically coupling the various modular components. An exemplary coupling 610 shows a first pigtail fiber 612 from a first component 614 coupled to a second pigtail fiber 616 from a second component 618 by a splice 640. In one implementation, the splices are fusion spliced. As is known, such a splice provides advantageous features associated with optical fibers as the two fiber segments are merged into one physically connected fiber optic path. In comparison with bulk optics, complicated and potentially fragile alignment and positioning are not required once the fibers are coupled together. The splice thereby provides a substantially consistent transmission of signals between the coupled components. Such techniques can be readily implemented and thus improve manufacturability and reduce cost. Using such techniques, the fibers' positions and coupling can also be made less vulnerable to environment changes thereby yielding an improved stability of the laser system. Other techniques such as butt coupling can also be employed in other embodiments.

Optical fibers are also compact and lightweight in comparison, for example, to lens systems, although lenses and other bulk optics may be used, for example, in different modules. Components coupled in the foregoing manner can be arranged in a variety of ways. Because the optical interconnection between modular components is provided by a fiber, the modules may not need to be aligned optically and the modules can be arranged and packaged in a flexible manner.

Figure 13:
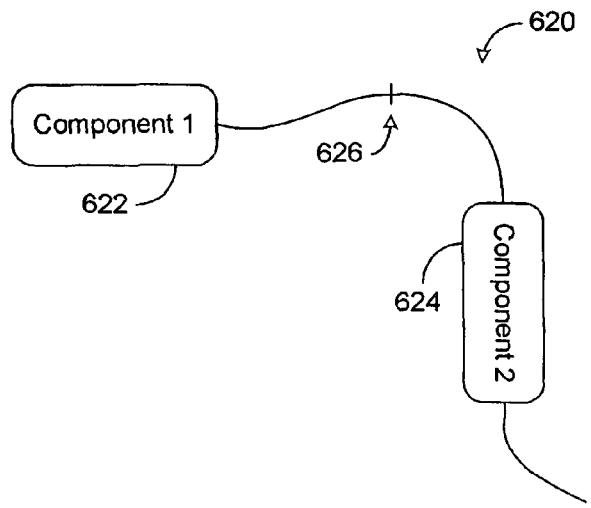
FIG. 13 illustrates some of possible advantages of flexibility in arrangement of modular components provided by the spliced optical coupling.

FIG. 13 illustrates an exemplary arrangement of modules where the alignment of the axes through the module (i.e., a direction that may be associated with freespace input and output coupling) is not a restrictive design limitation. As shown in FIG. 13, an exemplary coupling 620 optically couples a first component 622 to a second component 624 via a splice 626. Accordingly, the second component 624 is oriented such that the axis through the first component 622 need not be aligned with the axis through of the second component. Similarly, bulk optics such as reflectors or mirrors are not needed to provide optical connection between the two components 622, 624.

As described above, the modules may comprise one or more optical elements supported within a housing. These optical elements may be bulk optics such as lens and mirrors or other physical optics or may comprise waveguide structures such as planar waveguides. In some embodiments, fiber optic components may be included in such housings although optical fibers may be connected to the fiber pigtails extending from the housings and may not have individual housings. For example, one laser system may comprise a saturable absorber in a housing having an optical pigtail extending therefrom (such as in FIG. 11A) that is spliced to an oscillator fiber at least a portion of which is doped to provide gain and that includes a fiber Bragg grating as a partial reflector. The fiber Bragg grating may be spliced to an input pigtail of an isolator (such as in FIG. 11C) comprising bulk optics components disposed within a separate housing. An output pigtail extending from the isolator module may be spliced to another modulate containing bulk optics that form a variable attenuator (such as in FIG. 11B). The variable attenuator module may have an output fiber pigtail optical connected to a gain fiber comprising a fiber amplifier. The fiber amplifier may be spliced to a fiber Bragg grating or photonic crystal fiber that provides compression. Other configurations are also possible.

The modular approach described above offers many advantages. The fiber-based modular approach aids in designing, addressing limitations, and providing practical solutions for applications in medicine, industry, and other environments. In many cases, design of reliable and complex optical and laser systems is generally a difficult task involving expenditure of excessive resources and extensive amounts of time. Using modular opto-mechanical elements, an ultrashort pulse laser can be more efficiently designed for particular applications. Advantageously, the design of the system may be first simplified, which can be accomplished by dividing the system into several functional groups. The functionalities can be achieved with different modules which can be separately designed and tested. Design assessment of reliability can be achieved at much lower cost involving less time and less resources. Engineering of separate modules for product development is more manageable.

The modular approach can also significantly simplify the assembly process and improve the manufacturability of the laser systems. The laser systems can be assembled with simple fusion splices without free-space alignment. Such process can decrease labor costs and increase the operation stability, reliability, and repeatability. Repair, replacement, and upgrading may also be facilitated by the modular approach as the modules may be replaceable and/or interchangeable.

In various preferred embodiments, the optics within the modules comprise micro-optics elements although other types of optics are possible. Use of micro-optics and fiber optics provides compactness. Preferably, the optics are secured to the housing and the housing provides sufficient protection such that the laser systems are rugged and robust. In various embodiments, the housings may comprise thermal insulation and/or may be hermetically sealed to reduce buildup of condensation, moisture, dust, dirt, or other contamination that may interfere with the operation or reliability of the optical elements.

The modular design disclosed herein provides other advantages in the design and performance of high power short pulse laser systems. Reduced form factor and mass of the components may enable a high-degree of optical stability. Environmental stability of the system can be improved also by controlling the temperature of the devices. In some embodiments, the laser system can be packaged to meet the telecommunication standards in performance and quality. In some embodiments, for example, the laser system or portions thereof can be packaged in compliance with a Telcordia reliability assurance requirements such as GR-1221-CORE and GR-468-CORE.

The recent unprecedented growth of the telecom industry has resulted in the development of a mature fiber technology and reliable and cost-effective components. However, due to the nature of telecommunication requirements, the commercial fiber components are mostly limited by low power handling capability and continuous-wave (CW) operation. High average power (>200 mW) and ultrafast pulse operation involved specially designed components. Preferably, however, an ultrashort fiber laser and amplifier system may be provided that is in compliance of the applicable Telcordia reliability assurance requirements, for example, GR-468-CORE and GR-1221-CORE.

Environmentally stable laser design is highly desirable for industrial application. A preferred industrial laser system can, for example, be characterized by an output power variation below 0.5 dB over an environmental temperature range from 0 to 50 degree Celsius and by compliance of vibration, thermal shock, high temperature storage and thermal cycling test criteria in Telcordia GR-468-CORE and GR-1221-CORE. This target can be achieved by functional segmentation of components and using appropriate packaging in the modules such as for example Telcordia-qualified packaging technology. Accordingly, preferably, the modules are designed and manufactured to comply with telecom standards and quality.

As described above, various embodiments comprise a high power ultrashort pulses laser system having an output power over about 200 mW and a pulse width less than about 200 femtoseconds. Certain embodiments may employ a short length of gain fiber to enhance the gain stability of the oscillator against environmental temperature variation. In some embodiments, the cavity dispersion may be managed by adding undoped polarization maintaining fiber, which may be provided by a fiber pigtail integrated with the saturable absorber module. As discussed above, the saturable absorber and the optics associated with the saturable absorber may be packaged with telecommunication packaging technology to form a modular toolkit in the oscillator system. In some designs, the module can be integrated with a temperature controller.

In certain preferred embodiments, the light from the oscillator may be amplified. Also, the quality of the amplified pulse, such as minimum pedestal and compressibility, may be controlled by manipulating the spectral detail of the seed pulse out of oscillator. Such manipulation may be accomplished by using a spectral filter although other designs are possible. Depending on the detail of the chirp of the pulse and nonlinear phase distortion in the amplifier, in some embodiments, a grating pair having a properly selected center wavelength and bandwidth may provide suitable balance for the chirp such that the pulse can be compressed with a sufficiently high pulse quality. Furthermore, the spectral property of the filter can be further tailored for pedestal flattening in some embodiments. A specific pedestal flattening filter, for example, can be used. In certain embodiments, a parabolic amplifier may be used to amplify the seed pulse. In case of seed spectral bandwidth larger than 10 nm, a filter-type element may be inserted in front of amplifier to shorten the seed pulse width to improve or optimize the amplification and compressibility of the amplified pulse.

Other embodiments having different designs and configurations are possible and should not be limited to those described above. For example, although the various systems disclosed herein can operate in the wavelength of around 1050 nm, the concepts of the present teachings can also be applied to laser systems operating at other wavelengths.

Moreover, the above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. An amplification system for outputting pulses having a duration and corresponding pulse width comprising:
    a modelocked fiber oscillator outputting optical pulses;
    an amplifier disposed external to the modelocked fiber oscillator and optically connected to said modelocked fiber oscillator to receive said optical pulses, said amplifier comprising a gain medium that imparts gain to said optical pulses;
    a variable attenuator disposed between said modelocked fiber oscillator and said amplifier, said variable attenuator configured to receive said optical pulses from said modelocked fiber oscillator prior to reaching said amplifier, said variable attenuator having an adjustable transmission such that the amplitude of said optical pulses that are coupled from said mode-locked fiber oscillator to said amplifier can be reduced; and
    a compressor disposed external to said amplifier to compress the pulses to reduce the pulse width of the pulses, said compressor receiving amplified pulses from said amplifier,
    wherein said amplifier is configured such that attenuating said amplitude of the optical pulses coupled from said mode-locked fiber oscillator to said amplifier reduces the pulse width at an output of said compressor, and
    wherein said variable attenuator comprises a polarization selection optics.

2. The amplification system of claim 1, wherein said variable attenuator comprises a polarizer.

3. The amplification system of claim 1, wherein said variable attenuator further comprises a polarization rotation element.

4. The amplification system of claim 3, wherein said polarization rotation element comprises a waveplate.

5. The amplification system of claim 1, wherein said variable attenuator comprises one or more optical elements contained in a housing having input and output fibers extending therefrom for coupling light through said one or more optical elements.

6. The amplification system of claim 1, wherein said compressor comprises one or more dispersive optical elements.

7. The amplification system of claim 6, wherein said one or more dispersive optical elements comprises a dispersive optical fiber.

8. The amplification system of claim 1, wherein said pulses are attenuated by between about 1 to 20 dB.

9. A method of producing compressed high power short laser pulses having an optical power of at least about 200 mW and a pulse duration of about 200 femtoseconds or less, said method comprising:
    substantially mode-locking longitudinal modes of a laser cavity to repetitively produce a laser pulse;
    amplifying said laser pulse using an amplifier downstream from the laser cavity;
    chirping said laser pulse thereby changing the optical frequency of said pulse over time;
    compressing said laser pulse using a compressor downstream from the laser cavity by propagating different optical frequency components of said laser pulse differently to produce a compressed laser pulse having a shortened temporal duration; and
    selectively attenuating the amplitude of said laser pulse prior to said amplifying of said laser pulse using an attenuator downstream from the laser cavity to further shorten said duration of said compressed laser pulse,
    wherein said laser pulse is attenuated by between about 1 to 20 dB.

10. The method of claim 9, further comprising substantially maintaining the polarization of said laser pulse after said amplifying until said compressing of said laser pulse.

11. A method of manufacturing a high power short pulse fiber laser, said method comprising:
    mode-locking a fiber-based oscillator that outputs optical pulses;
    optically coupling an amplifier to said fiber-based oscillator through a variable attenuator so as to feed said optical pulses from said fiber-based oscillator through said variable attenuator and to said amplifier; and adjusting said variable attenuator based on a measurement of said optical pulses to reduce the intensity of the optical pulses delivered to said amplifier and to shorten pulses at the output of the amplifier;

wherein said amplifier and said variable attenuator are disposed downstream from said fiber-based oscillator, and wherein said optical pulses are attenuated by between about 1 to 20 dB.

12. The method of claim 11, further comprising optically coupling a pulse compressor to said amplifier to shorten said optical pulses.

13. The method of claim 11, further comprising pumping said amplifier to amplify said optical pulses from said fiber-based oscillator and compressing said optical pulses, said optical pulses after said amplifying and compressing having an average power of at least about 200 mW and a pulse duration at least as short as 200 femtoseconds.

14. The method of claim 11, wherein said variable attenuator is adjusted based on a measurement of the power of said optical pulses.

15. The method of claim 11, wherein said variable attenuator is adjusted based on a measurement of the pulse duration of said output pulses.

16. The method of claim 11, further comprising packaging said attenuator in a sealed housing.

17. The method of claim 11, further comprising packaging at least a portion of said oscillator in a sealed housing.

18. An amplification system for outputting pulses having a pulse width, said amplification system comprising:

a modelocked fiber oscillator producing an optical output comprising a plurality of optical pulses having a pulse width and a spectral power distribution having a bandwidth;

an amplifier disposed external to the modelocked fiber oscillator and optically connected to said modelocked fiber oscillator for amplifying said optical pulses;

a variable attenuator disposed between said modelocked fiber oscillator and said amplifier; and a spectral filter disposed external to the modelocked fiber oscillator and between said oscillator and said amplifier, said spectral filter configured to receive said optical output of said modelocked fiber oscillator prior to reaching said amplifier, said spectral filter having a spectral transmission with a band edge that overlaps said spectral power distribution of said optical output of said modelocked fiber oscillator to attenuate a portion of said spectral power distribution and thereby reduce the spectral bandwidth, the pulse width of said optical pulses coupled from said modelocked fiber oscillator to said amplifier thereby being reduced, wherein said spectral filter reduces the spectral bandwidth to less than about 12 nanometers, wherein said spectral filter has a spectral bandwidth of between about 5 and 12 nm; and wherein said variable attenuator comprises polarization selection optics.

19. The amplification system of claim 18, wherein said spectral filter comprises a filter selected from the group consisting of a bandpass filter, a low pass filter, and a high pass filter.

20. The amplification system of claim 18, wherein said spectral filter comprises a bandpass filter.

21. The amplification system of claim 18, wherein said spectral filter comprises a grating.

22. The amplification system of claim 18, wherein said spectral filter comprises a long period fiber Bragg grating.

23. The amplification system of claim 18, wherein said spectral filter is disposed in a housing having input and output fibers that couple optical output of said modelocked fiber oscillator through said spectral filter.

24. A method of producing compressed optical pulses, said method comprising:

substantially mode-locking longitudinal modes of a fiber resonant cavity so as to produce a train of modelocked optical output pulses having a corresponding spectral power distribution with a spectral bandwidth;

amplifying said modelocked optical output pulses using an amplifier external to said fiber resonant cavity;

compressing said modelocked optical output pulses using a compressor external to said fiber resonant cavity to produce compressed optical pulses; and reducing the spectral bandwidth of said spectral power distribution prior to amplifying using a spectral filter external to said fiber resonant cavity such that said compressed modelocked optical output pulses have a shorter duration, wherein said spectral bandwidth is reduced to less than about 12 nanometers, and wherein said spectral bandwidth is reduced by between about 5 to 12 nm.

25. The pulsed fiber laser of claim 24, wherein said spectral bandwidth is reduced to less than about 10 nm.

26. A system for producing compressed high power short laser pulses having an optical power of at least about 200 mW and a pulse duration of about 200 femtoseconds or less, said system comprising:

a mode locked oscillator to mode-lock longitudinal modes of a laser cavity to repetitively produce a laser pulse;

at least one fiber amplifier amplifying said laser pulse, said at least one amplifier disposed downstream from the laser cavity;

a pulse stretcher comprising a length of optical fiber or a chirped fiber Bragg grating, said stretcher chirping said laser pulse thereby changing the optical frequency of said optical pulse over time;

a pulse compressor to compress said laser pulse by propagating different optical frequency components of said laser pulse differently to produce a compressed laser pulse having a shortened temporal duration, said compressor disposed downstream from the laser cavity; and an attenuator to selectively attenuate the amplitude of said laser pulse prior to said amplifying of said laser pulse, said attenuator disposed downstream from the laser cavity to further shorten said duration of said compressed laser pulse, and wherein said laser pulse is attenuated by between about 1 to 20 dB.

27. The system of claim 26, wherein said variable attenuator comprises a polarization selection optic.

* * * * *

UNITED STATES PATENT AND TRADEMARK OFFICE
CERTIFICATE OF CORRECTION

| | | |
|---|---|---|
| PATENT NO. | : 7,804,864 B2 | Page 1 of 1 |
| APPLICATION NO. | : 10/814319 | |
| DATED | : September 28, 2010 | |
| INVENTOR(S) | : Xinhua Gu et al. | |

It is certified that error appears in the above-identified patent and that said Letters Patent is hereby corrected as shown below:

At Title Page 2, Item 56, Column 1, Line 1, under Other Publications, please change "at al.," to --et al.,--.

At Column 4, Line 16, please change "fembosecond" to --femtosecond--.

At Column 12, Line 46, please change "516" to --510--.

At Column 14, Line 47, please change "resonantor" to --resonator--.

Signed and Sealed this
Third Day of April, 2012

David J. Kappos
*Director of the United States Patent and Trademark Office*

UNITED STATES PATENT AND TRADEMARK OFFICE
CERTIFICATE OF CORRECTION

PATENT NO. : 7,804,864 B2
APPLICATION NO. : 10/814319
DATED : September 28, 2010
INVENTOR(S) : Xinhua Gu et al.

Page 1 of 1

It is certified that error appears in the above-identified patent and that said Letters Patent is hereby corrected as shown below:

Title Page 1, at Item 75, Column 1, under Inventors, please change "Choen" to --Cheon--.

Signed and Sealed this
Twenty-ninth Day of May, 2012

David J. Kappos
*Director of the United States Patent and Trademark Office*